(12) United States Patent
Underhill

(10) Patent No.: US 12,100,851 B2
(45) Date of Patent: Sep. 24, 2024

(54) BATTERY BOX

(71) Applicant: THE NOCO COMPANY, Glenwillow, OH (US)

(72) Inventor: Derek Michael Underhill, Tempe, AZ (US)

(73) Assignee: The NOCO Company, Glenwillow, OH (US)

( * ) Notice: Subject to any disclaimer, the term of this patent is extended or adjusted under 35 U.S.C. 154(b) by 193 days.

(21) Appl. No.: 17/644,419

(22) Filed: Dec. 15, 2021

(65) Prior Publication Data

US 2023/0187754 A1 Jun. 15, 2023

(51) Int. Cl.
| | |
|---|---|
| *H01M 50/244* | (2021.01) |
| *H01M 10/06* | (2006.01) |
| *H01M 50/249* | (2021.01) |
| *H01M 50/267* | (2021.01) |
| *H01M 50/271* | (2021.01) |
| *H01M 50/30* | (2021.01) |

(52) U.S. Cl.
CPC ......... *H01M 50/244* (2021.01); *H01M 10/06* (2013.01); *H01M 50/249* (2021.01); *H01M 50/267* (2021.01); *H01M 50/271* (2021.01); *H01M 50/30* (2021.01); *H01M 2220/20* (2013.01)

(58) Field of Classification Search
CPC .. H01M 50/244; H01M 50/249; H01M 50/30; H01M 50/267; H01M 50/271; H01M 2220/20
USPC ........................................................ 206/703
See application file for complete search history.

(56) References Cited

U.S. PATENT DOCUMENTS

| | | | | |
|---|---|---|---|---|
| 3,741,815 A | * | 6/1973 | Peterson ............. | H01M 50/271 206/703 |
| 3,904,439 A | * | 9/1975 | Barrett, Jr. .......... | H01M 50/262 220/769 |
| 4,225,655 A | * | 9/1980 | Pesce .................. | H01M 50/298 206/811 |
| 4,279,342 A | * | 7/1981 | Van Pelt ............... | A45C 11/20 455/344 |
| 5,004,129 A | * | 4/1991 | Loch ................... | H01M 50/227 206/703 |
| 5,845,803 A | * | 12/1998 | Saito ..................... | H05K 5/061 220/241 |
| 6,367,646 B1 | | 4/2002 | Hoagland et al. | |

(Continued)

OTHER PUBLICATIONS

Patent Cooperation Treaty, PCT/US2022/081525, International Search Report and Written Opinion of the International Searching Authority, Mar. 10, 2023.

(Continued)

*Primary Examiner* — Jacob K Ackun
(74) *Attorney, Agent, or Firm* — Jones Day

(57) ABSTRACT

A battery box for containing a battery. The battery box, including a lower battery container configured to define a lower receiver for accommodating a lower portion of the battery therein, an upper lid releasably connected to the container for covering the lower receiver of the lower battery container, the upper lid configured to define an upper receiver for accommodating an upper portion of the battery, and one or more snap fit connections for releasably connecting the upper lid to the lower battery container.

36 Claims, 22 Drawing Sheets

(56) References Cited

U.S. PATENT DOCUMENTS

| | | | |
|---|---|---|---|
| 2011/0210135 A1* | 9/2011 | Huff | B65D 55/14 |
| | | | 220/780 |
| 2011/0315464 A1 | 12/2011 | Yokoyama et al. | |
| 2012/0097693 A1* | 4/2012 | Takeuchi | B60R 16/0239 |
| | | | 220/810 |
| 2012/0223113 A1 | 9/2012 | Gaisne et al. | |
| 2013/0183561 A1 | 7/2013 | Laitinen | |
| 2014/0106195 A1* | 4/2014 | Milbourne | H01M 50/264 |
| | | | 429/100 |
| 2020/0274116 A1* | 8/2020 | Warren | H01M 50/262 |
| 2021/0265693 A1* | 8/2021 | Peña | H01M 50/267 |
| 2023/0121037 A1* | 4/2023 | Zhang | H01M 50/262 |
| | | | 429/176 |

OTHER PUBLICATIONS

Patent Cooperation Treaty, PCT/US2022/081525, International Preliminary Report on Patentability, Jun. 27, 2024.

* cited by examiner

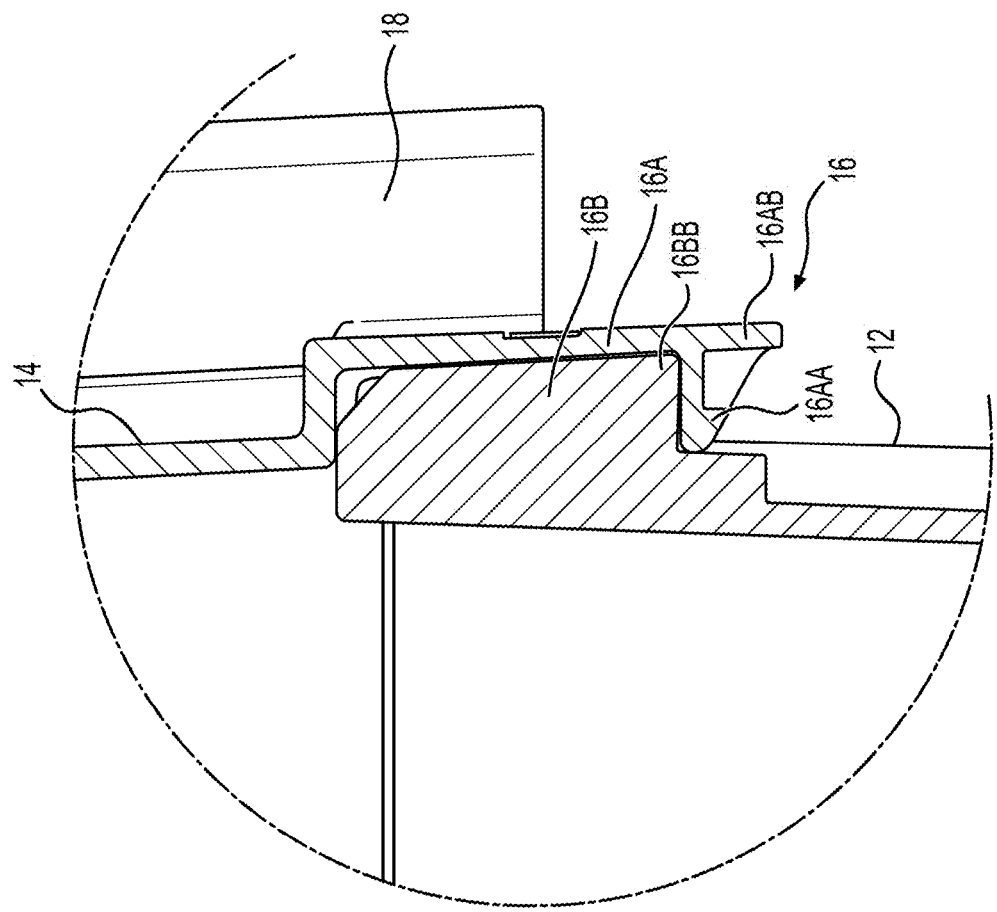
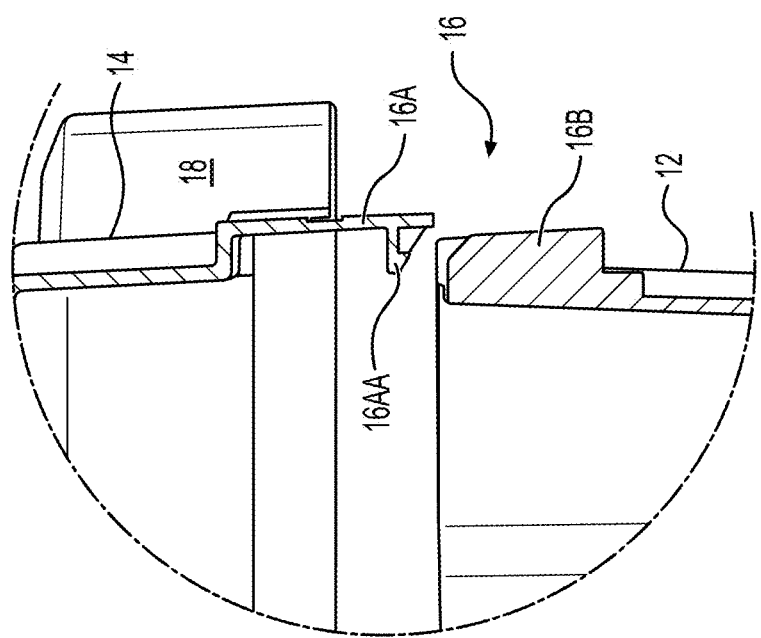

BATTERY BOX

FIELD

The present invention is directed to a battery box for a battery, for example, a snap-top battery box for accommodating a battery, for example, a vehicle battery.

BACKGROUND

Today, most batteries for starting a vehicle are lead acid batteries. However, Li-ion batteries are being developed and produced to replace lead acid starting batteries and to make other types of batteryies (e.g. EV batteries).

A battery box is disclosed and discussed in U.S. Pat. No. 6,367,646 issued on Apr. 9, 2002 to Hoagland et al.

There exists a need to secure the battery on a vehicle, for example, a boat or road vehicle. Further, there exists a need to contain any acid leaking from a lead acid battery, and to vent gases released by a lead acid battery.

SUMMARY

The present invention is directed to a battery box. The battery box, for example, is configured to accommodate a battery (e.g. lead acid battery, Li-ion battery). The battery box is configured to store the battery and protect the battery inside from the weather. Further, the battery box is configured to make it easy for a user to lift and carry the battery from one location to another.

The battery box, for example, can be configured to contain acid when containing a lead acid battery, and to vent gases released by the lead acid battery. Further, the battery box can be configured to vent head when containing a Li-ion battery.

The battery box comprising a lower battery container and an upper lid. The upper lid, for example, is configured to snap fit onto the lower battery container. For example, battery box is provided with one or more snap fit connections.

The one or more snap fit connections, for example, comprise an upper snap fit connection part and a lower snap fit connection part configured to snap fit together for securing the upper lid onto the lower battery container.

The upper lid, for example, is configured to fit over an upper lip of the lower battery container. The upper lip, for example, has a double wall construction to enhance the structural strength of the upper lip of the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, and wherein the one or more tabs defines an inner horizontal-oriented channel for snap fitting the one or more protrusions therein.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, wherein the one or more tabs defines an inner horizontal-oriented channel for snap fitting the one or more protrusions therein, and wherein the one or more tabs are each provided with a rectangular-shaped channel and the one or more protrusions are rectangular-shaped protrusions configured to nest within the rectangular-shaped channel of the one or more tabs.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, wherein the one or more tabs defines an inner horizontal-oriented channel for snap fitting the one or more protrusions therein, wherein the one or more tabs are each provided with a rectangular-shaped channel and the one or more protrusions are rectangular-shaped protrusions configured to nest within the rectangular-shaped channel of the one or more tabs, and wherein a lower inner edge of the one or more tabs of the upper lid is beveled and an upper edge of the one or more protrusions of the lower battery container are beveled so that the beveled lower inner edge of the one or more tabs ride on the beveled upper edge of the one or more protrusions of the lower battery box to force the one or more tabs outwardly when pressing the upper lid onto the lower battery container to allow the one or more snap fit connections to snap fit together.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, wherein the one or more tabs defines an inner horizontal-oriented channel for snap fitting the one or more protrusions therein, wherein the one or more tabs are each provided with a rectangular-shaped channel and the one or more protrusions are rectangular-shaped protrusions configured to nest within the rectangular-shaped channel of the one or more tabs, wherein a lower inner edge of the one or more tabs of the upper lid is beveled and an upper edge of the one or more protrusions of the lower battery container are beveled so that the beveled lower inner edge of the one or more tabs ride on the beveled upper edge of the one or more protrusions of the lower battery box to force the one or more tabs outwardly when pressing the upper lid onto the lower battery container to allow the one or more snap fit connections to snap fit together, and wherein the one or more tabs of the upper lid and the one or more protrusions of the lower battery container of the one or more snap fit connections are configured to disconnect by a user grip the lower edge of the one or more tabs and forcing the lower edge outwardly to disconnect the one or more snap fit connections.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, wherein the one or more tabs defines an inner horizontal-oriented channel for snap fitting the one or more protrusions therein, and wherein the one or more tabs extend downwardly from the upper lid, and the one or more tabs are configured to allow a user to grip a lower edge of the one or more tabs and force the lower edge outwardly to disconnect the one or more snap fit connections.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, wherein the one or more tabs defines an inner horizontal-oriented channel for snap fitting the one or more protrusions therein, and wherein each or the one or more tabs comprises a lower inwardly extending lip for gripping a lower horizontal surface of each of the one or more protrusions of the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more air vent holes.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more air vent holes, and wherein the one or more air vent holes is provided through an upper wall of the upper lid.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more air vent holes, wherein the one or more air vent holes is provided through an upper wall of the upper lid, and wherein the one or more air vent holes a located at or adjacent to a highest position within the upper receiver of the upper lid.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more air vent holes, wherein the one or more air vent holes is provided through an upper wall of the upper lid, wherein the one or more air vent holes a located at or adjacent to a highest position within the upper receiver of the upper lid, and wherein the upper wall of the upper lid is provided with an upwardly extending protrusion, and the one or more air vents are located through a side wall of the upwardly extending protrusion.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more air vent holes, wherein the one or more air vent holes is provided through an upper wall of the upper lid, wherein the one or more air vent holes a located at or adjacent to a highest position within the upper receiver of the upper lid, wherein the upper wall of the upper lid is provided with an upwardly extending protrusion, and the one or more air vents are located through a side wall of the upwardly extending protrusion, and wherein the one or more air vents located through the side wall of the upwardly extending protrusion are weather resistant and hidden.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more air vent holes, wherein the one or more air vent holes is provided through an upper wall of the upper lid, wherein the one or more air vent holes a located at or adjacent to a highest position within the upper receiver of the upper lid, wherein the upper wall of the upper lid is provided with an upwardly extending protrusion, and the one or more air vents are located through a side wall of the upwardly extending protrusion, wherein the one or more air vents located through the side wall of the upwardly extending protrusion are weather resistant and hidden, and wherein the one or more air vents located through the side wall of the upwardly extending protrusion are formed using slides in the mold tooling.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the front wall and rear wall of the lower battery container are each provided with a recessed strap receiving groove.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein a front wall and a rear wall of the upper lid are each provided with a recessed strap receiving groove.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the front wall and rear wall of the lower battery container are each provided with a recessed strap receiving groove, wherein a front wall and a rear wall of the upper lid are each provided with a recessed strap receiving groove, and wherein the recess strap receiving grooves on the upper lid are aligned with the recessed strap receiving grooves on the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein a front wall and a rear wall of the upper lid are each provided with a recessed strap receiving groove, and wherein an upper wall of the upper lid is provided with one or more recessed strap receiving grooves.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the front wall and rear wall of the lower battery container are each provided with a recessed strap receiving groove, and wherein a front wall and a rear wall of the upper lid are each provided with a recessed strap receiving groove, and wherein an upper wall of the upper lid is provided with one or more recessed strap receiving grooves aligned with the recess strap receiving grooves on the front wall and the rear wall of the upper lid.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the front wall and rear wall of the lower battery container are each provided with a recessed strap receiving groove, wherein a front wall and a rear wall of the upper lid are each provided with a recessed strap receiving groove, wherein an upper wall of the upper lid is provided with one or more recessed strap receiving grooves aligned with the recess strap receiving grooves on the front wall and the rear wall of the upper lid, and wherein the recess strap receiving grooves on the upper lid are aligned with the recessed strap receiving grooves on the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the left wall and right wall of the lower battery box is provided with cut-ins or recesses.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the left wall and right wall of the lower battery box is provided with cut-ins or recesses, and wherein the cut-ins or recess are each provided with a finger receiver for receiving finger tips of the user for lifting the battery box.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the left wall and right wall of the lower battery box is provided with cut-ins or recesses, wherein the cut-ins or recess are each provided with a finger receiver for receiving finger tips of the user for lifting the battery box, and wherein an upper edge portion of each finger receiver is provided with spaced apart ribs or teeth to enhance the grip between the user's fingers and the finger receivers.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein at least a portion of a bottom wall of the lower battery container is provided with a honey comb matrix molded into an upper surface of the bottom wall for reinforcing the bottom wall.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the one or more snap fit connections is defined by one or more tabs provided on one or more sides of the upper lid cooperating with one or more protrusions provided on one or more sides of the lower battery container, wherein the one or more tabs defines an inner horizontal-oriented channel for snap fitting the one or more protrusions therein, wherein each or the one or more tabs comprises a lower inwardly extending lip for gripping a lower horizontal surface of each of the one or more protrusions of the lower battery container, and wherein the upper lid is provided with a protrusion extending upwardly from an upper wall of the upper lid, the one or more vent holes being located in an upper wall of the upper lid at a position to vent air located in an upper receiver for the battery.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more bump outs for accommodating one or more battery cables when the upper lid is connected to the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the lower battery container is provided with one or more bump ins for accommodating one or more battery cables when the upper lid is connected to the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the upper lid is provided with one or more bump outs for accommodating one or more battery cables when the upper lid is connected to the lower battery container, and wherein the lower battery container is provided with one or more bump ins for accommodating one or more battery cables when the upper lid is connected to the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a strap for securing the battery box to a vehicle.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a strap for securing the battery box to a vehicle, and further comprising a bracket for securing the strap to the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a strap for securing the battery box to a vehicle, and further comprising a bracket for securing the strap to the lower battery container, wherein the bracket fits into a groove provided in the outer bottom wall of the lower battery container, and wherein the bracket is connected to the bottom wall of the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a divider configured to fit within the lower receiver of the lower battery container, the divider is configured to adjust a size of the lower receiver of the lower battery container to fit different size batteries.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, wherein the inner sides of the front wall and rear wall of the lower battery container is provided with multiple spaced apart vertically oriented grooves to allow the divider to be located at different positions with the lower receiver of the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a divider configured to fit within the lower receiver of the lower battery container, the divider is configured to adjust a size of the lower receiver of the lower battery container to fit different size batteries, wherein the divider is configured with a molded honeycomb-shaped wall and surrounding frame.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a divider configured to fit within the lower receiver of the lower battery container, the divider is configured to adjust a size of the lower receiver of the lower battery container to fit different size batteries, wherein upper edges of the front wall and rear wall of the lower battery container is provided with spaced-apart ribs or teeth, and sides of the divider are provided with opposed gripping extensions cooperating with sets of grooves located between the spaced-apart ribs or teeth on the upper edges of the front wall and rear wall of the lower battery container.

The presently described subject matter is directed to a battery box for containing a battery, the battery box comprising: a lower battery container configured to define a lower receiver for accommodating a lower portion of the battery therein; an upper lid releasably connected to the container for covering the lower receiver of the lower battery container, the upper lid configured to define an upper receiver for accommodating an upper portion of the battery; and one or more snap fit connections for releasably connecting the upper lid to the lower battery container, further comprising a divider configured to fit within the lower receiver of the lower battery container, the divider is configured to adjust a size of the lower receiver of the lower battery container to fit different size batteries, wherein the lower battery container comprises a bottom wall, a pair of opposed front and rear walls connected together by a pair of opposed side walls, the front walls and side walls extending upwardly from the bottom wall together defining a receiver for the battery.

BRIEF DESCRIPTION OF DRAWINGS

FIG. 14A is a detailed view of the snap fit connection with the upper lid disconnected from the lower battery container of the battery box shown in FIG. 1.

FIG. 14B is a detailed view of the snap fit connection with the upper lid connected to the lower battery container of the battery box shown in FIG. 1.

DETAILED DESCRIPTION

A battery box 10 according to the present invention is shown in FIGS. 1-8. The battery box 10 comprises a lower battery container 12 and an upper lid 14. The upper lid 14 can be releasably connected to the lower battery container 12, for example, by providing one or more snap fit connections 16. For example, snap fit connections 16 are provide on the front and rear of the battery box 10. The snap fit connections 16 can be relocated at other positions on the battery box 10 (e.g. left side and right side).

The lower battery container 12 comprises a structural double wall upper lip 12H (FIG. 8) to enhance the structural strength of an upper lip 12H of the lower battery container 12. The double wall construction of the upper lip 12H comprises the upwardly extending main walls of the lower battery container 12 and the downwardly extending partial outer wall of the upper lip 12H. Further, the upper lid 14 is configured to fit over the upper lip 12H of the lower battery container 12 (i.e. over-the top ergonomic snap-top) to enhance the structural strength of the battery box 10 and prevent water from leaking into the inside of the battery box 10.

Figure 2:
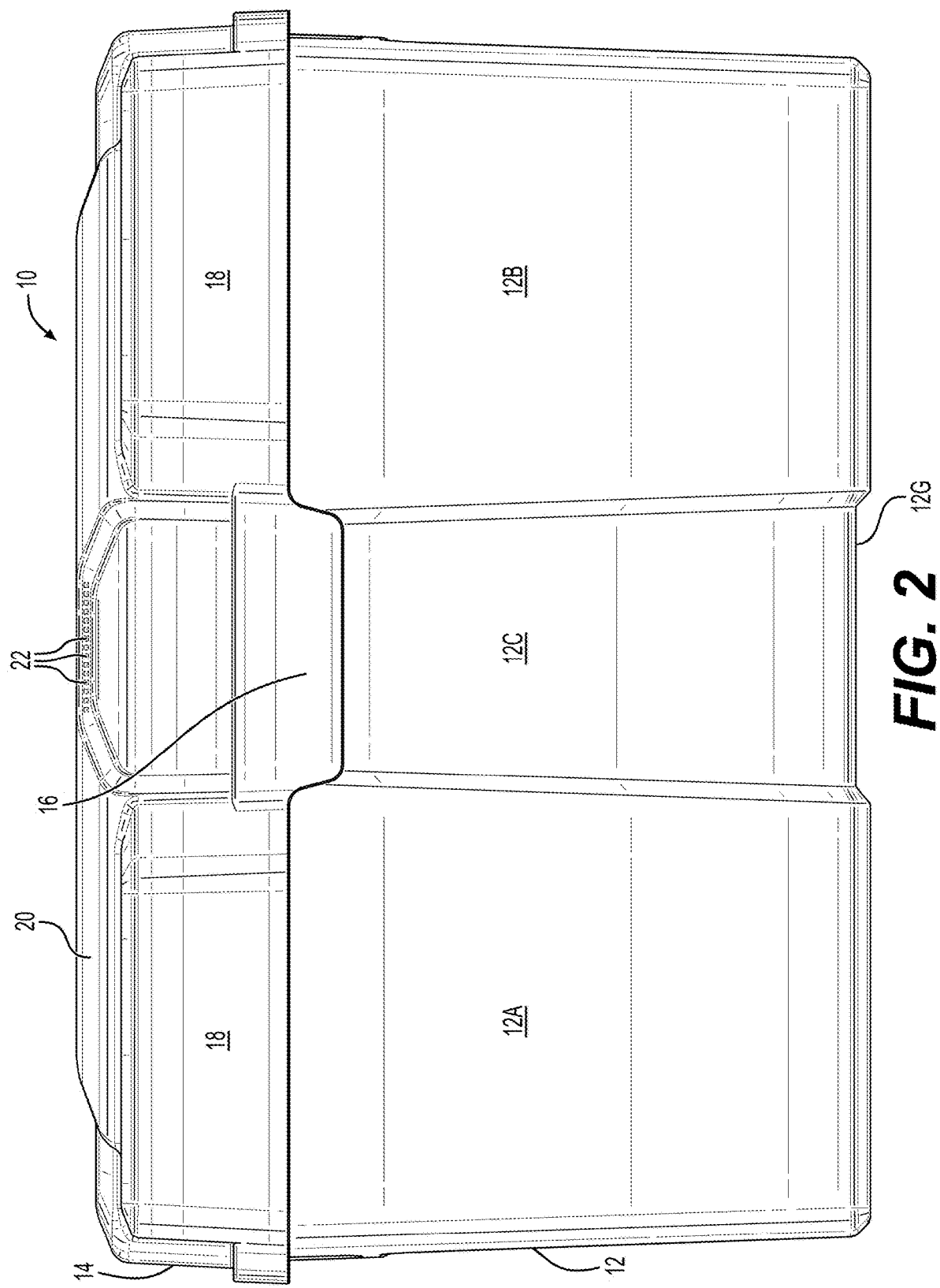
FIG. 2 is front elevational view of the battery box shown in FIG. 1.
Figure 3:
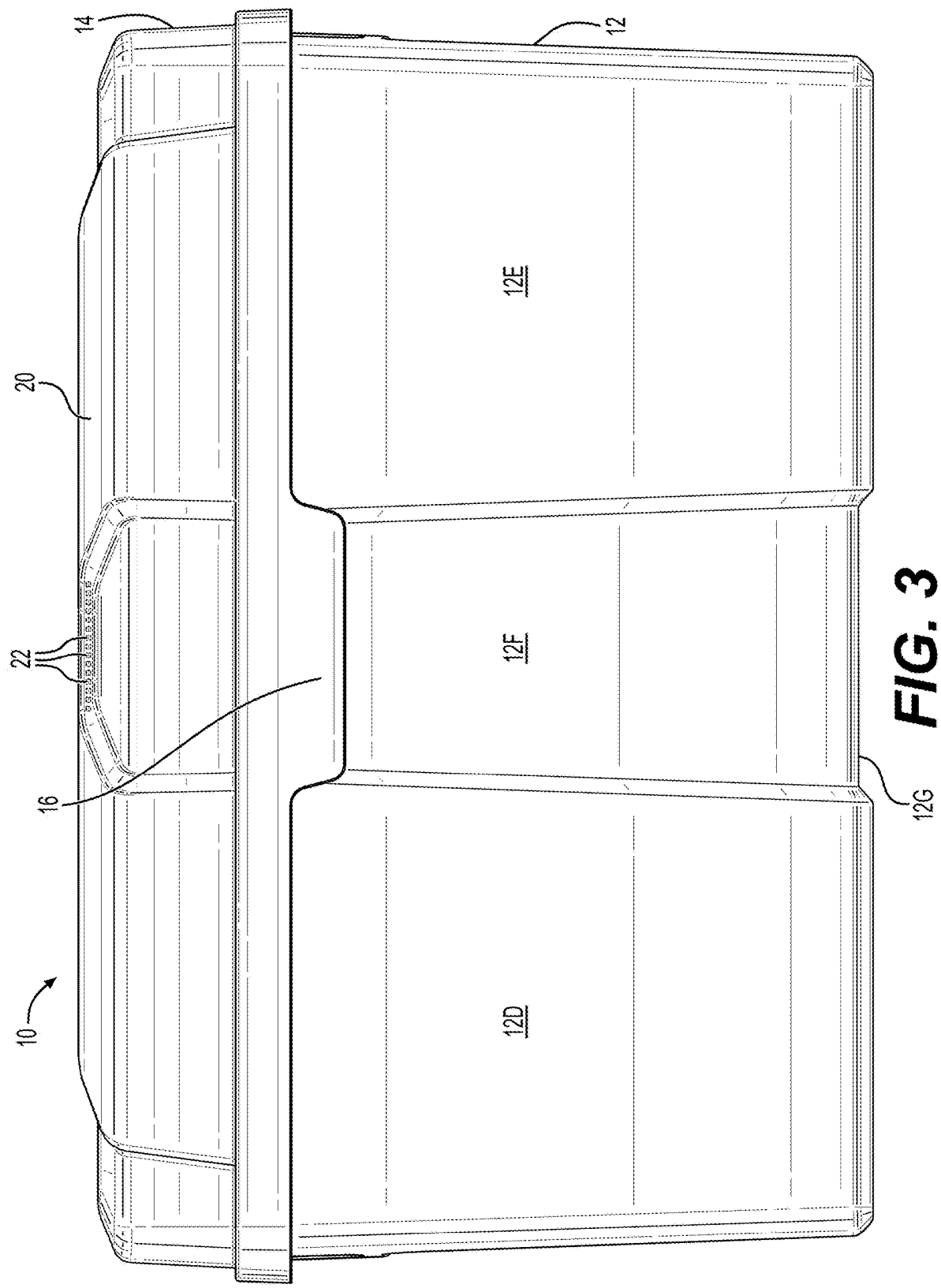
FIG. 3 is a rear elevational view of the battery box shown in FIG. 1.

The front side and of the lower battery container 12 comprises spaced apart front panels 12A and 12B and a front centered recessed channel 10C, as shown in FIG. 2. The rear side of the lower battery container comprises spaced apart rear panels 12D and 12E and a rear centered recessed channel 12F, as shown in FIG. 3. The bottom of the container comprises a recessed channel 12G, as shown in FIGS. 2 and 3. The recessed channels 12C,12F, 12G are aligned with each other, and, for example, can accommodate a strap for securing the upper lid 14 on the lower battery container 12.

Figure 1:
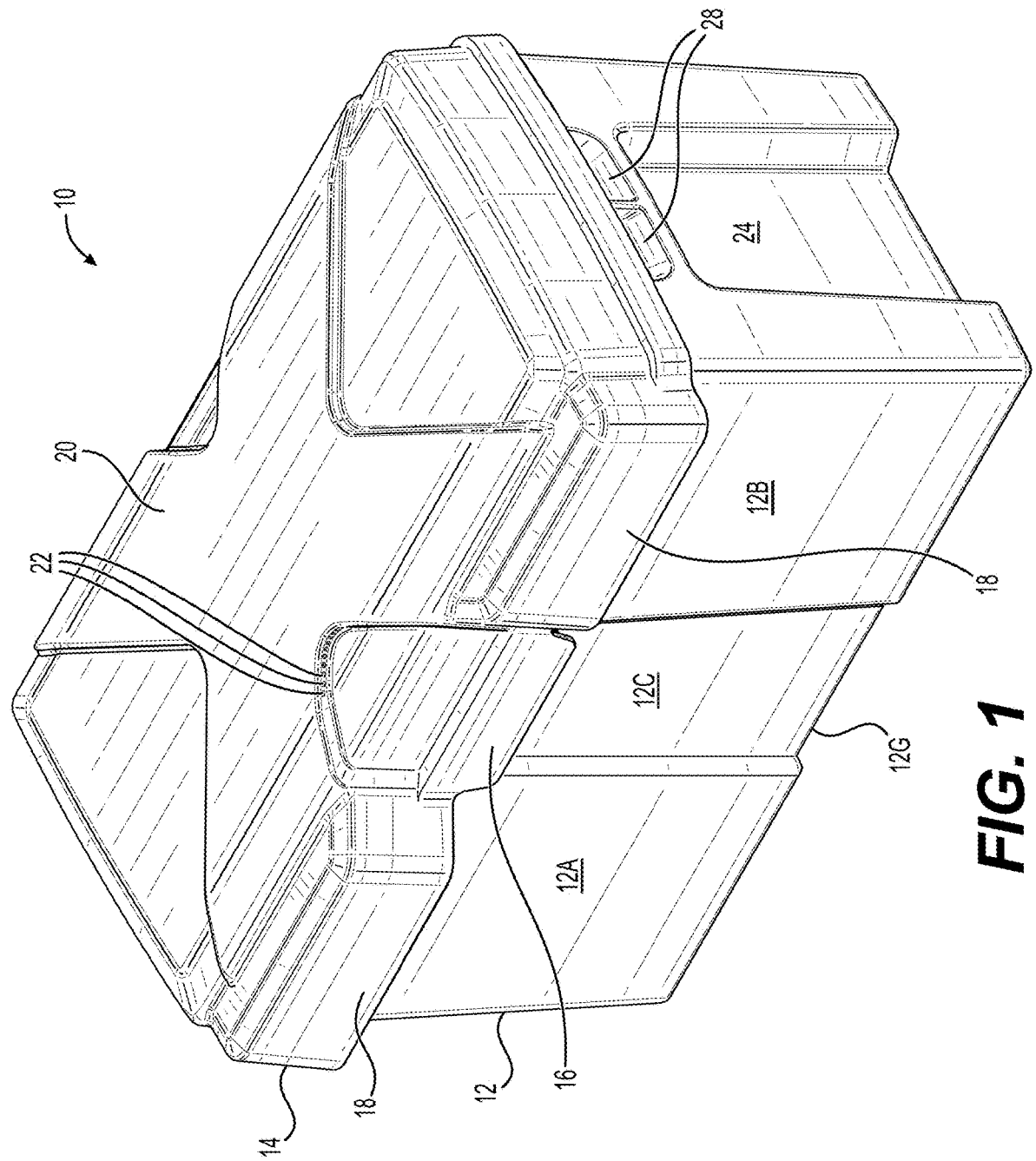
FIG. 1 is a perspective view of a battery box according to the present invention with the upper lid installed on the lower battery container.
Figure 6:
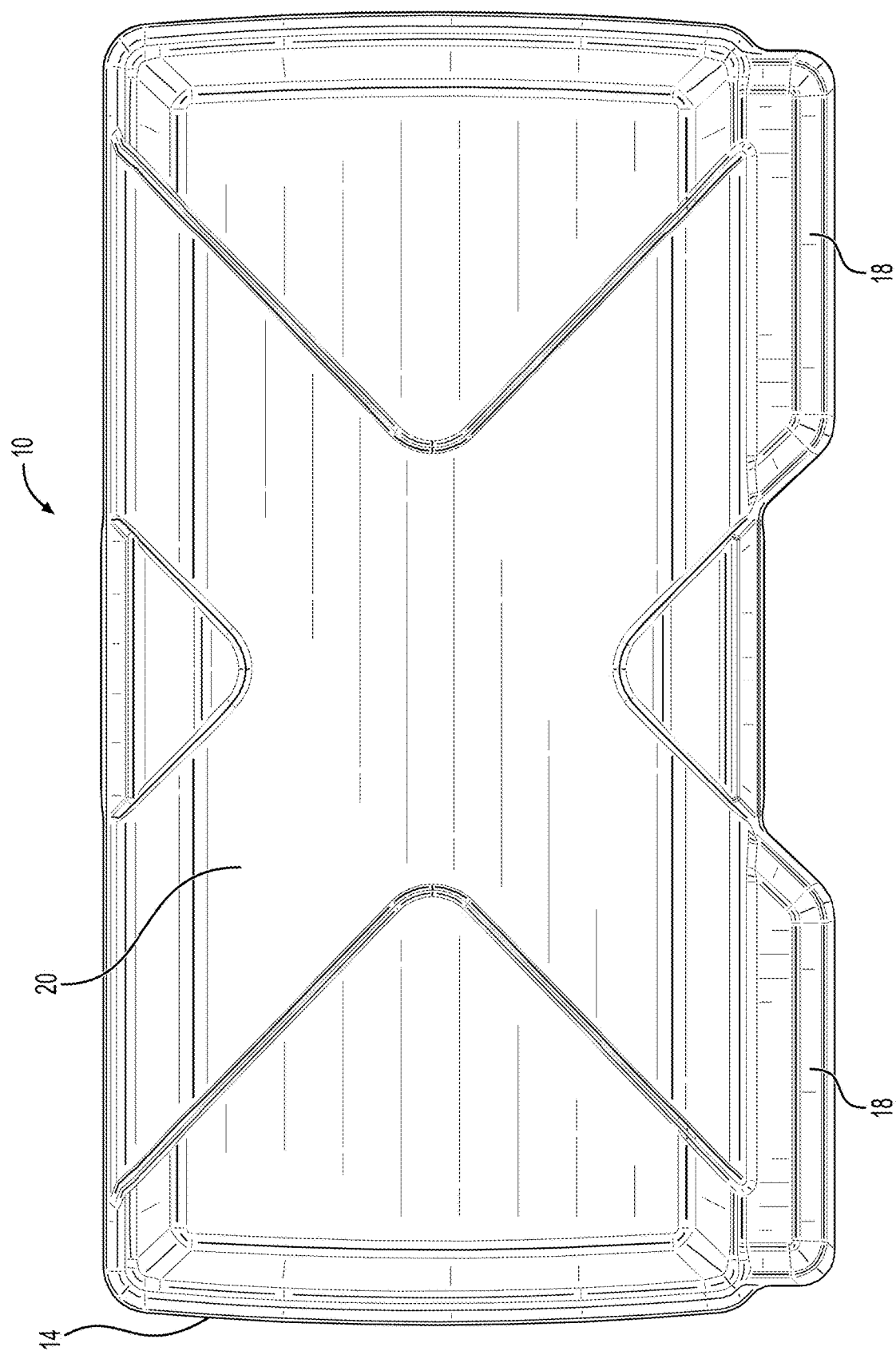
FIG. 6 is a top planar view of the battery box shown in FIG. 1.
Figure 7:
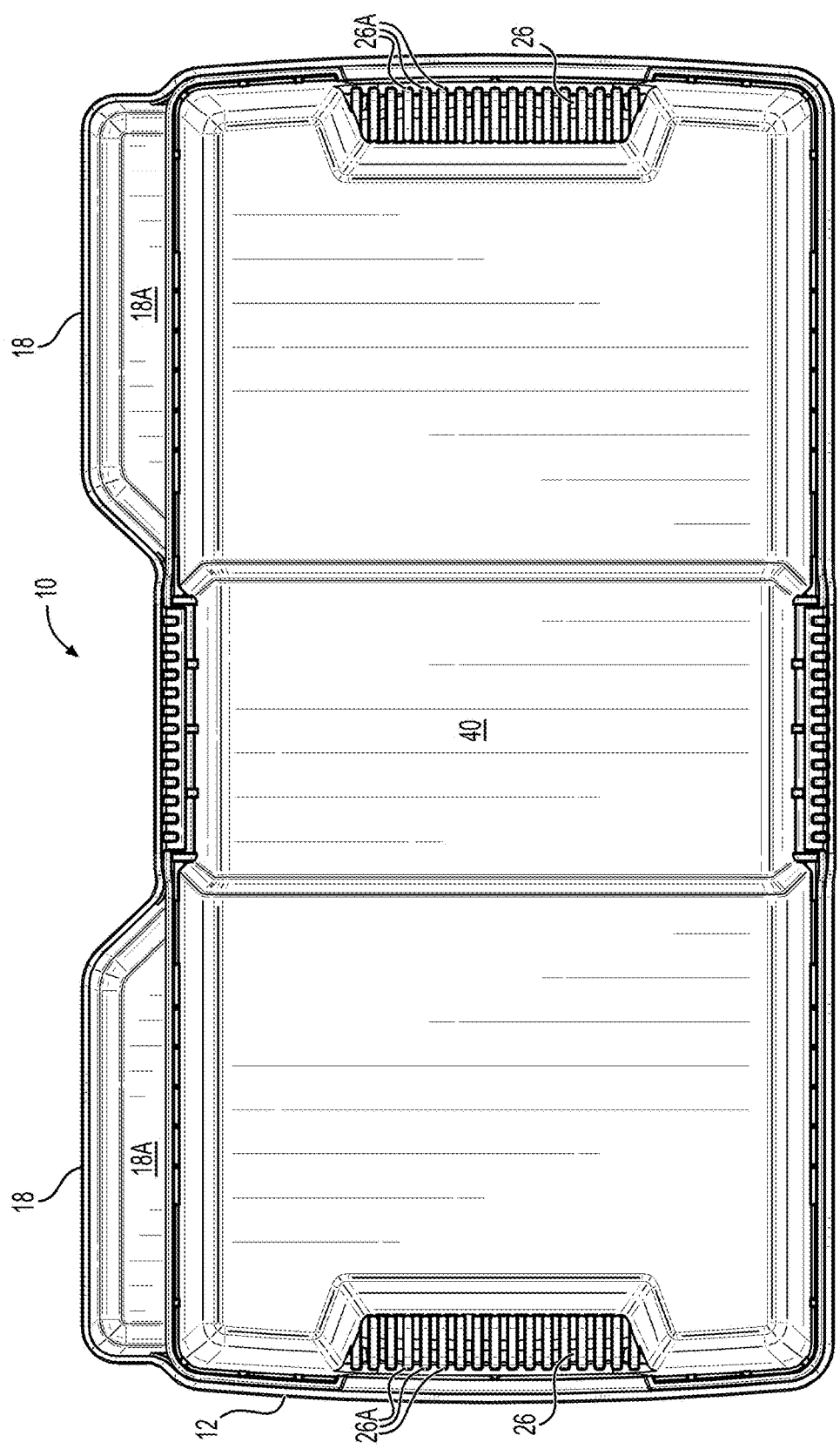
FIG. 7 is a bottom planar view of the battery box shown in FIG. 1.
Figure 8:
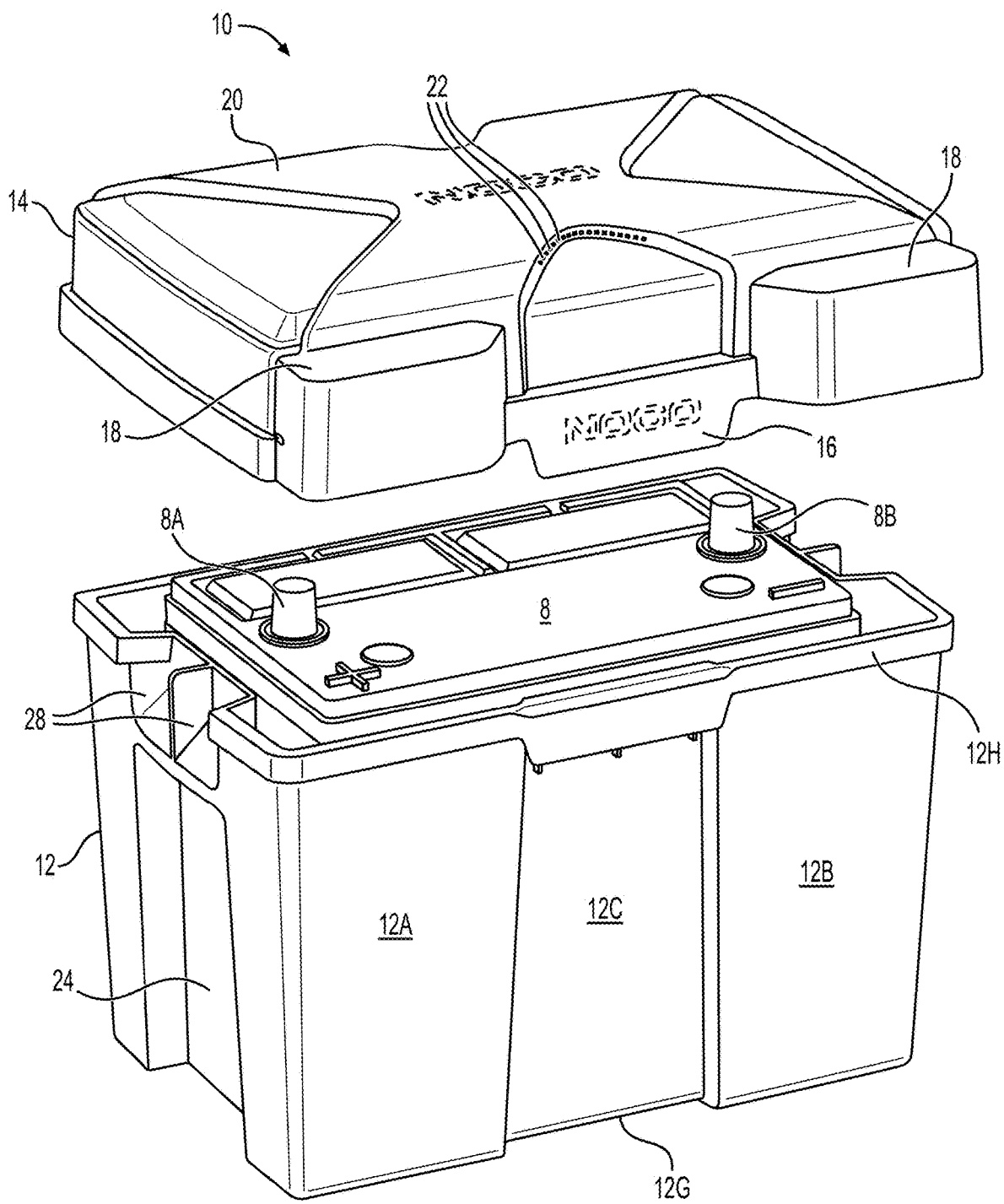
FIG. 8 is a perspective view of the battery box shown in FIG. 1 with the upper lid disconnected from the lower battery container.
Figure 9:
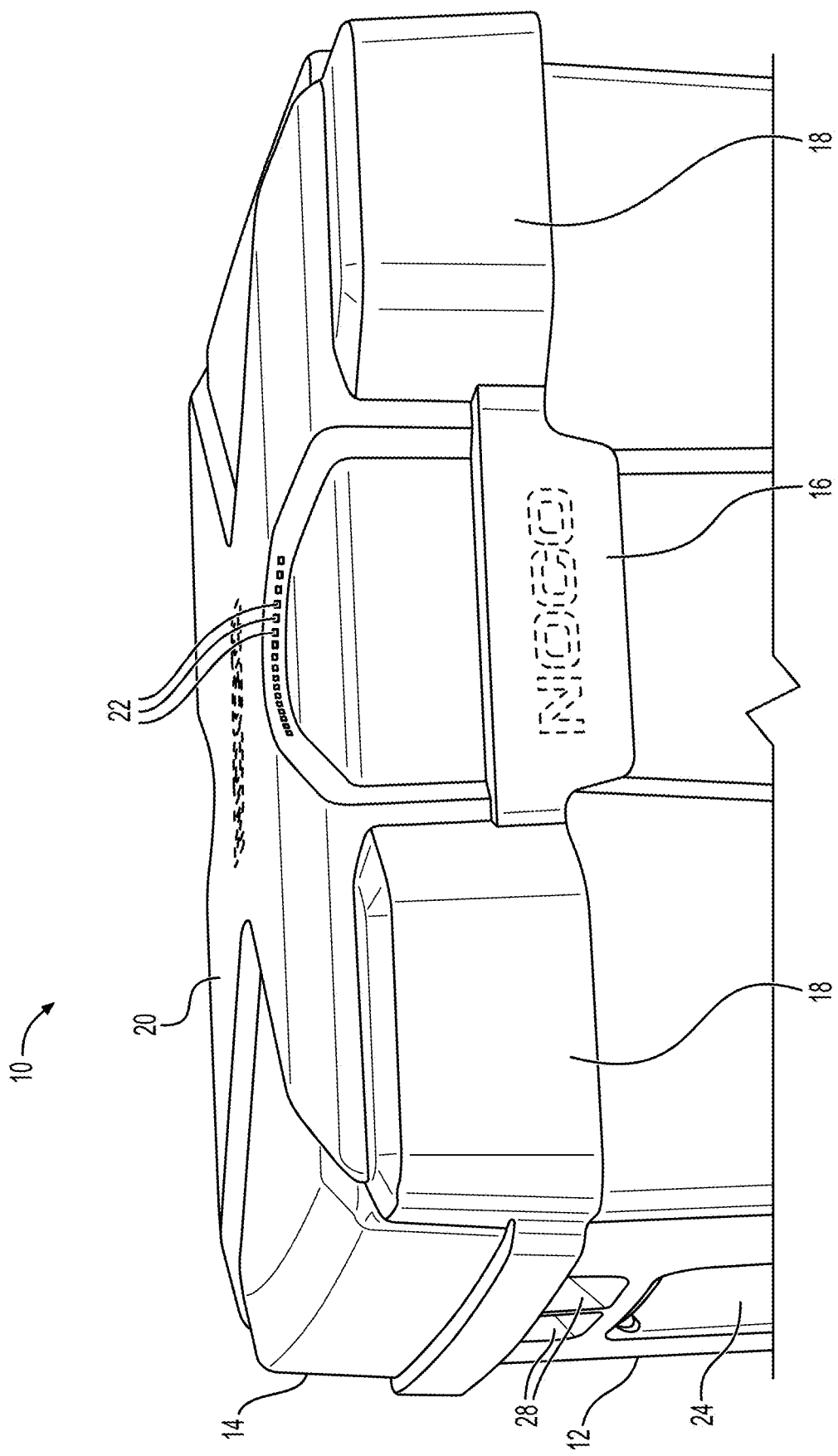
FIG. 9 is a partial perspective view of an upper portion of the battery box shown in FIG. 1.
Figure 10:
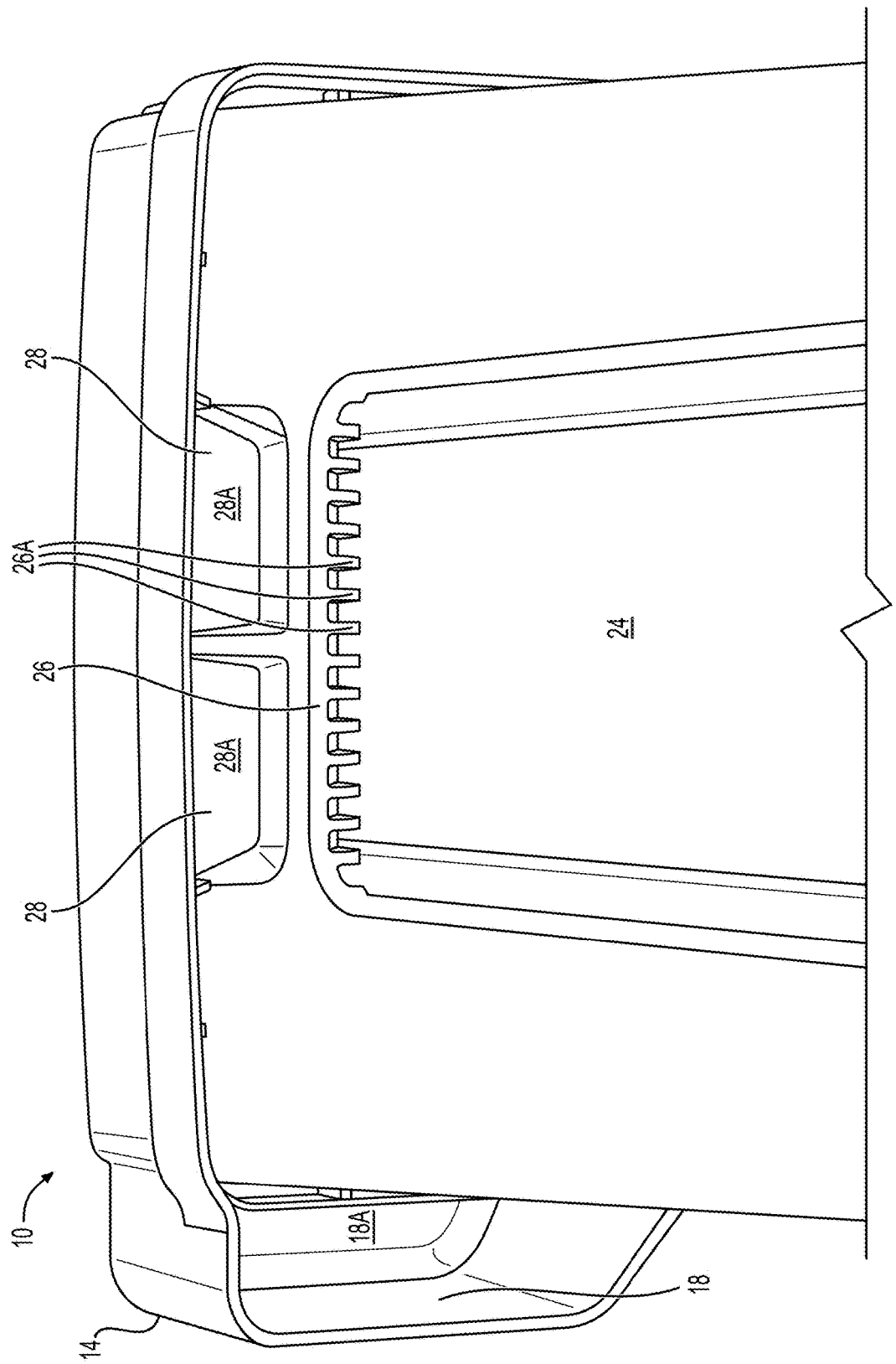
FIG. 10 is partial right side perspective view of the upper portion of the battery box shown in FIG. 1.

The upper lid 14 is provided with a pair of bump-outs 14A, 14B provided on a front side of the upper lid 14, as shown in FIGS. 1 and 6. The bump-outs 18 extend outwardly from the upper lid 14 beyond the location of the front panels 12A, 12B of the lower battery container 12 to provide passageways 18A to accommodate ingress/egress of the battery cables (FIG. 15) extending between the upper lid 14 and lower battery container 12 when connected to the battery terminals 8A, 8B of the battery 8 disposed within the battery box 10. The bump-outs 18 can be re-located to other positions on the upper lid 14 (e.g. left side and right side of the upper lid 14).

The upper lid 12 comprises a protrusion 20 (e.g. X-shaped protrusion), as shown in FIGS. 1 and 6. The protrusion 20 provides an air space (e.g. upper receiver for accommodating upper portion of the battery) located above the battery. The protrusion 20 is provided with one or more air vents 22 (FIGS. 2 and 3) to allow battery gases and heat to escape from the air space above the battery.

The air vents 22 are provided through a side wall (e.g. vertical wall) of the protrusion 20 so that the air vents 22 are hidden and not exposed to the weather (e.g. weather resistant, rain resistant).

The upper lid 14 and lower battery container 12 can be made, for example, by plastic injection molding plastic resin (e.g. polyethylene, polypropylene, polyurethane) to form the lower battery container 12 and the upper lid 14 as single piece plastic parts or units to assemble together to form the battery box 10. The air vents 22, for example, can be made by providing slides in the tooling (e.g. slides provided in the plastic injection mold).

Figure 4:
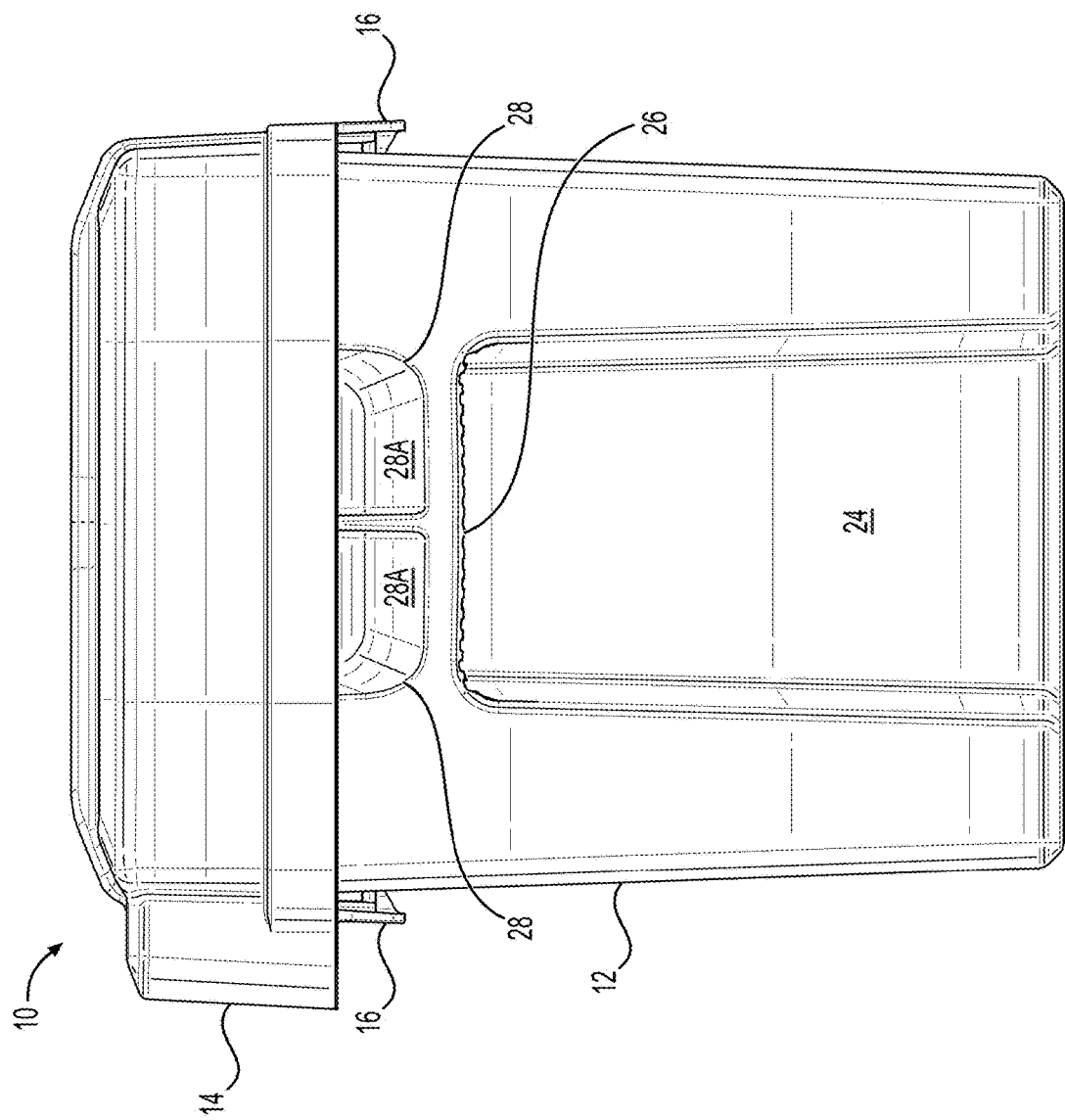
FIG. 4 is a right side elevational view of the battery box shown in FIG. 1.
Figure 5:
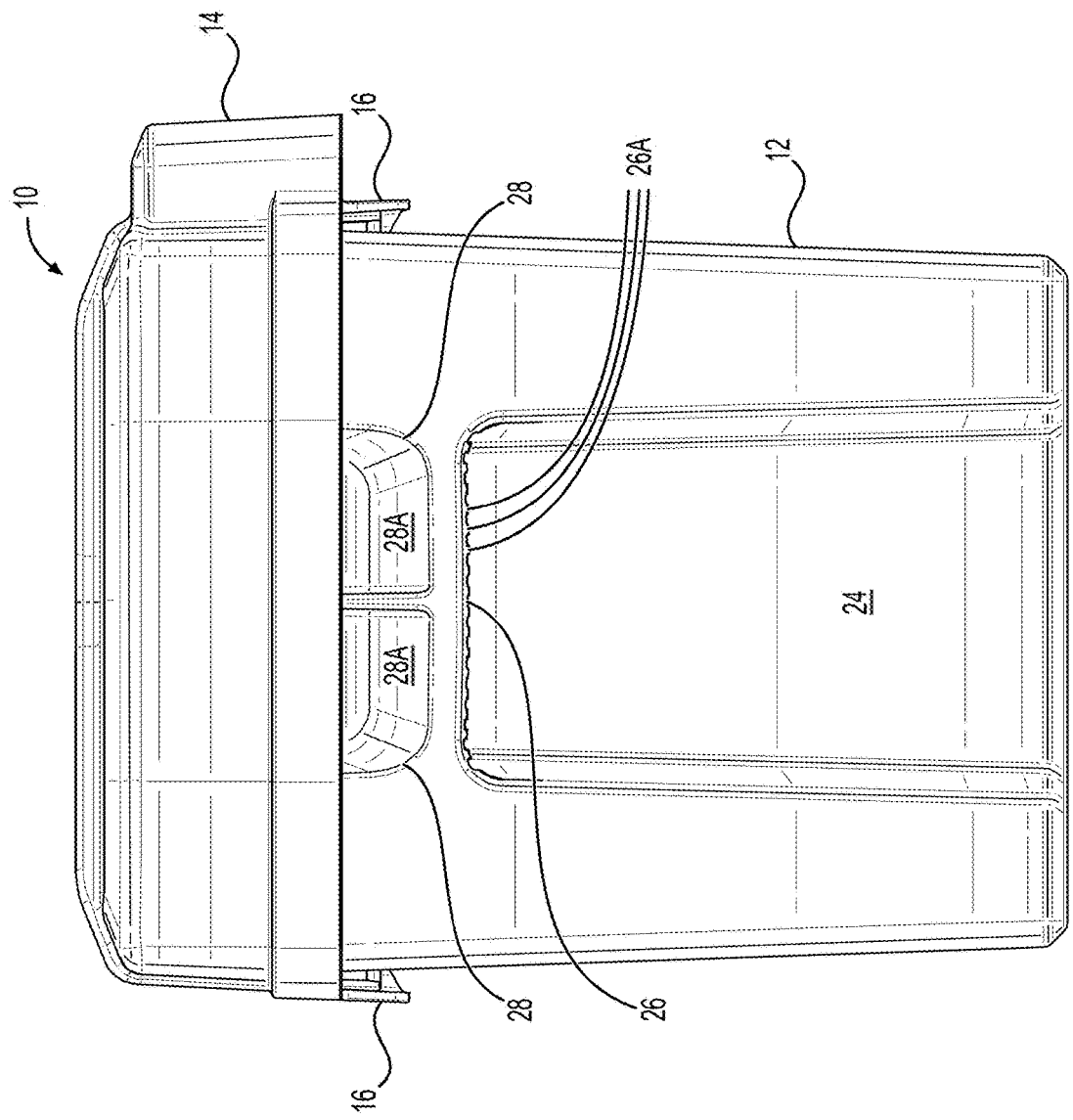
FIG. 5 is a left side elevational view of the battery box shown in FIG. 1.

The left side and right side of the lower battery container 12 are each provided with a lower cut-in 24 (e.g. recessed channel, vertical nesting cut-in) configured to define handles 26, as shown in FIGS. 4 and 5. The lower cut-ins 24 are configured to accommodate the user's hands so that the user can grip the handles 26 with his or her fingertips. The handles 26 are provided with spaced apart protrusions 26A (e.g. ribs, teeth) to provide ergonomic grips for pressure relief by distributing the weight on the user's hands and fingers, while adding strength the lower battery container 12 and reducing plastic usage. The vertical nesting cut-ins 24 also increase the structural strength of the lower battery container 12 when lifting the battery box 10 containing, for example, a heavy battery.

The left side and right side of the lower battery container 12 are also each provided with an upper cut-in 28 (e.g.

recessed channel, vertical nesting cut-in), as shown in FIGS. 4 and 5. The upper cut-ins 24 are configured to provide passageways 28A to accommodate ingress/egress of the battery cables (FIG. 15) extending between the upper lid 14 and lower battery container 12 when connected to the battery terminals 8A, 8B of the battery 8 disposed within the battery box 10. The upper cut-ins 28 can be re-located to other positions on the lower battery container 12 (e.g. front side and rear side of the lower battery container 12).

Figure 11:
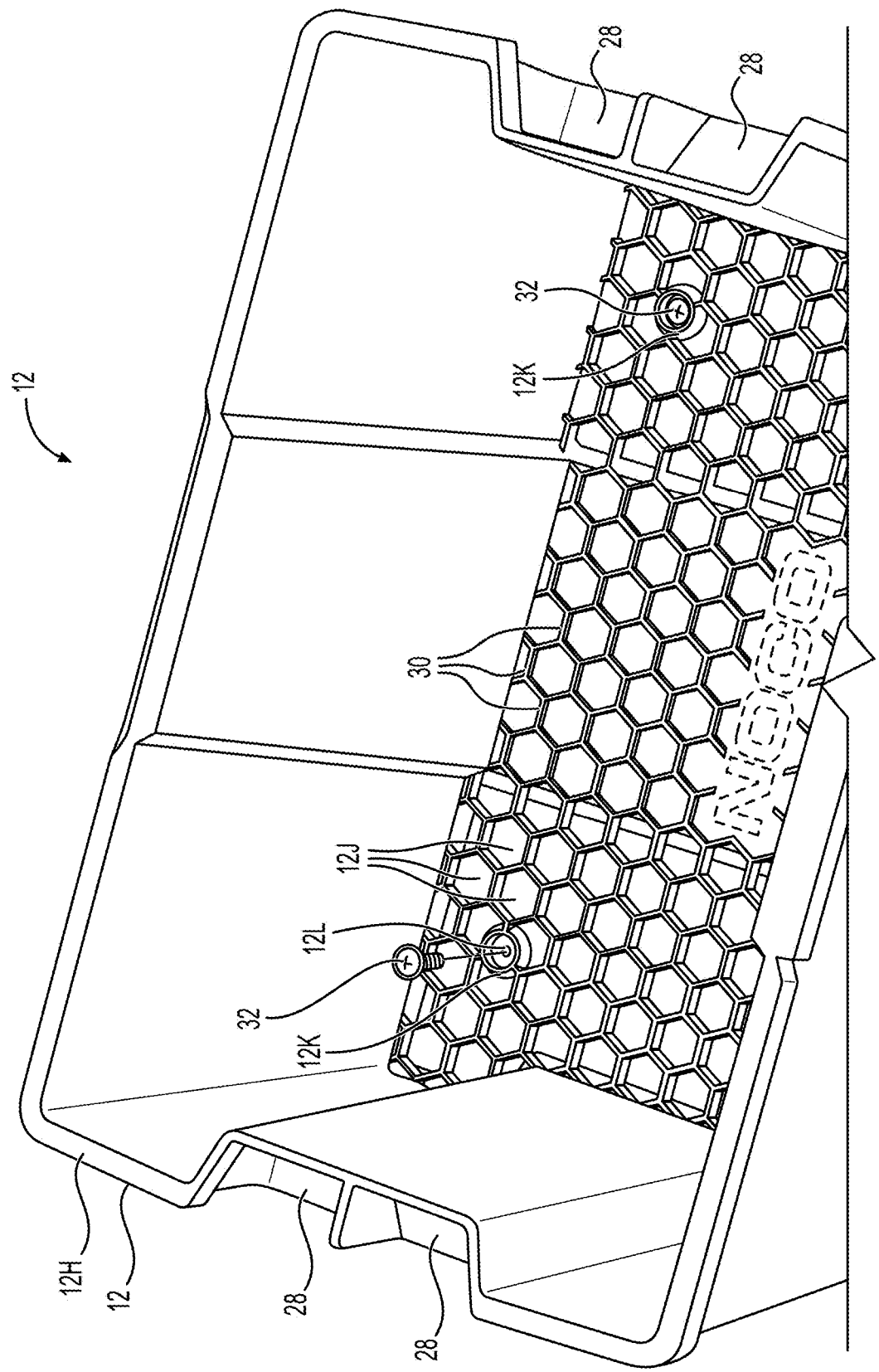
FIG. 11 is a partial upper perspective view of the inside of the battery box shown in FIG. 1.
Figure 12:
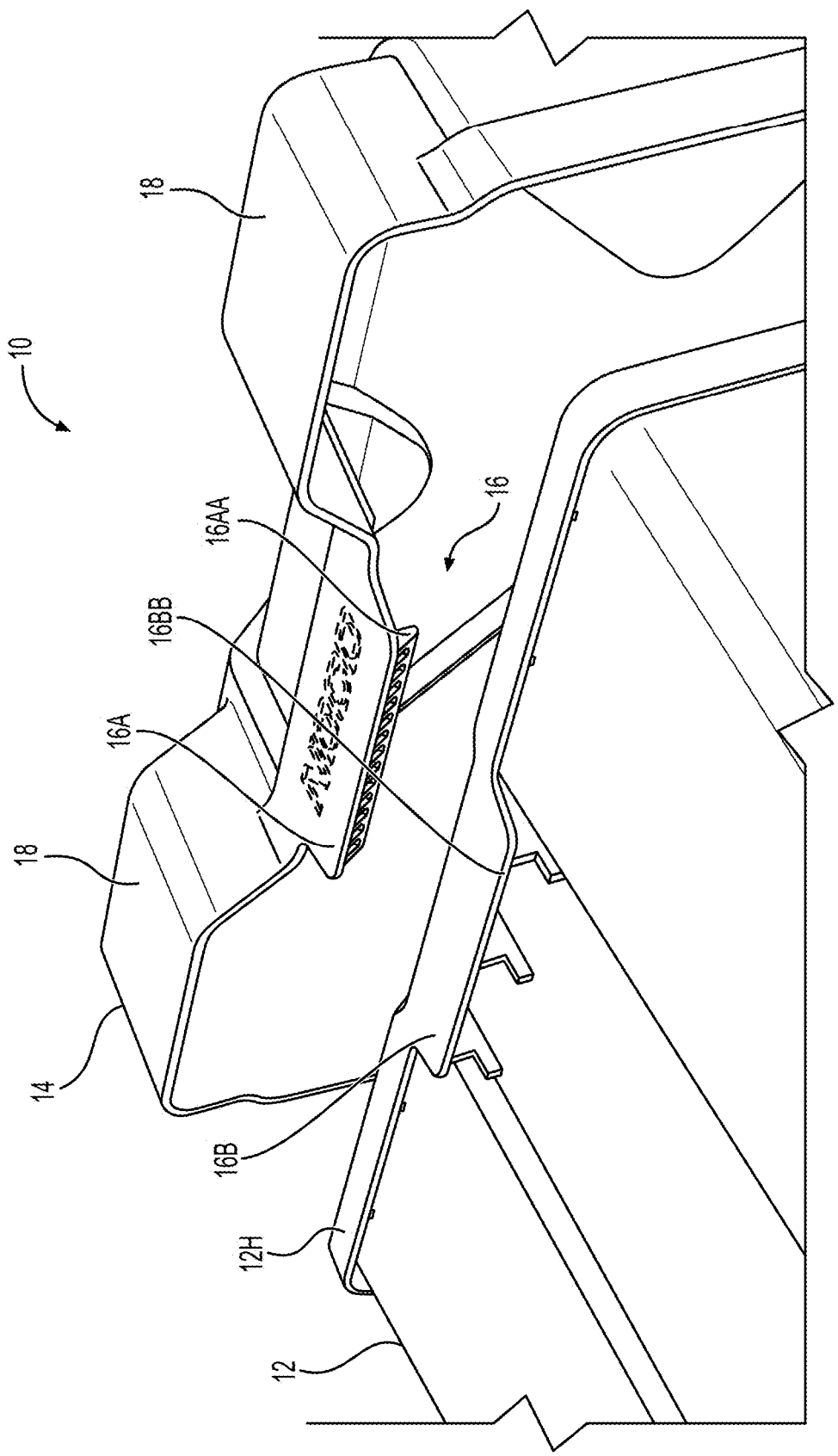
FIG. 12 is a partial left side perspective view of the upper portion of the battery box shown in FIG. 1.
Figure 13:
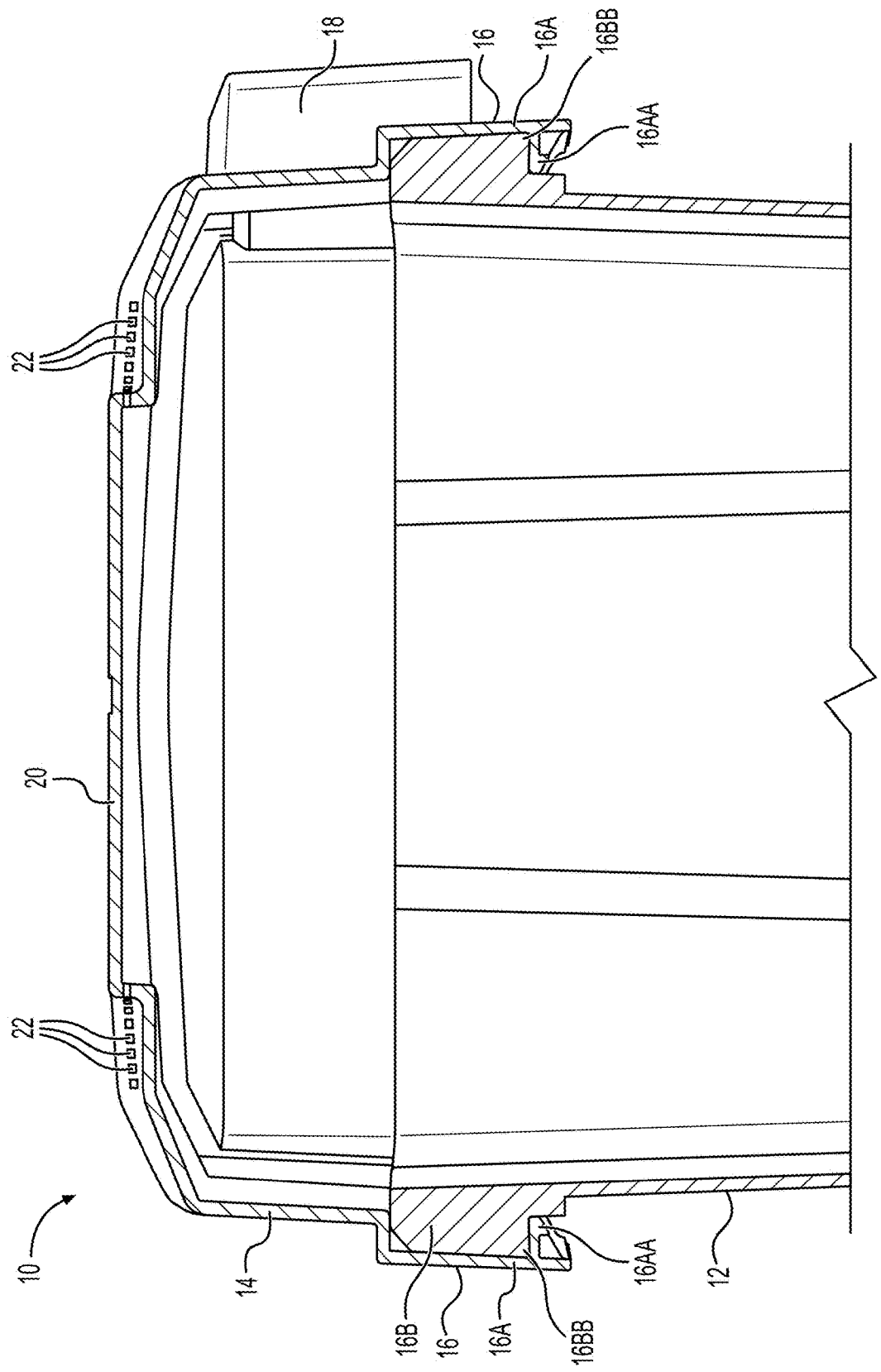
FIG. 13 is a cross-sectional view along a width of the battery box shown in FIG. 1.

The bottom wall 12J of the lower battery container 12 is reinforced by providing honey comb shaped ribs 30 to the inner side of the bottom wall 20J, as shown in FIG. 11. Specifically, the bottom wall 12J and honey comb shaped ribs 30 are integrally plastic molded together as a single integral construction. The bottom wall 12J is also provided with ring-shaped ribs 12K each having a through hole 12L. A screw 32 is fitted into each through hole 12L, and screwed into the vehicle (e.g. vehicle sheet metal) to secure the lower battery container 12 to the vehicle.

The configuration of the snap fit connector 16 is shown in FIGS. 12, 13, 14A, 14B. The snap fit connector 16 comprises an upper snap fit connection part 16A and a lower snap fit connection part 16B. The upper snap fit connection part 16A is provided with a lip 16AA to cooperate and releasably connect (i.e. snap fit) to a lower edge 16BB of the lower snap fit connection part 16B. The upper snap fit connection part 16A connects to the lower snap fit connection part 16B when the upper lid 14 is forced downwardly onto the lower battery container 12. The upper snap fit connection part 16A is disconnected to the lower snap fit connection part 16B by gripping the lower edge 16AB (FIG. 14B) with the user's fingertip and pulling the lower edge 16AB outwardly away from the lower battery container 12 to disconnect the lower snap fit connection part 16B from the upper snap fit connection part 16A.

Figure 15:
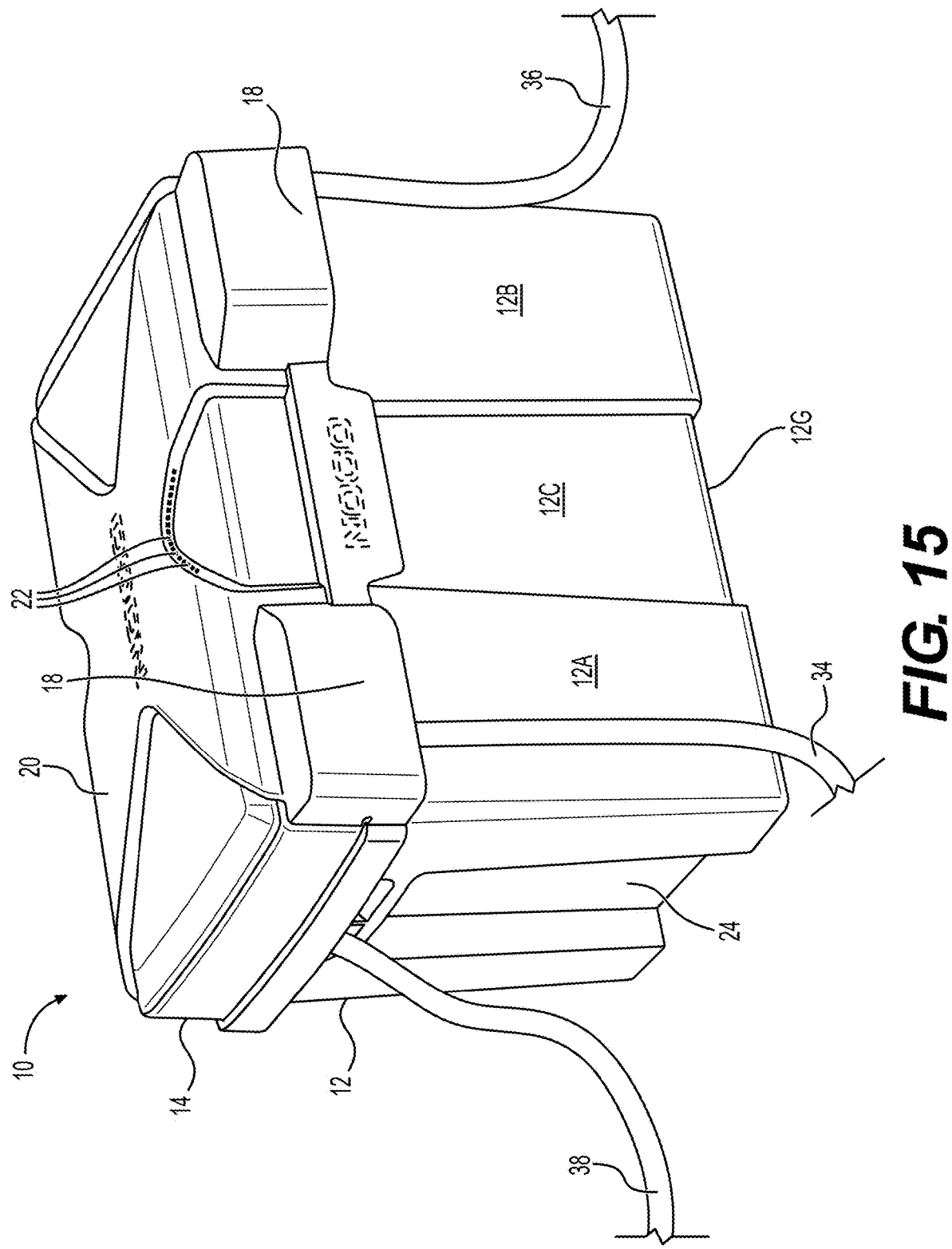
FIG. 15 is a perspective view of a battery box according to the present invention with the upper lid installed on the lower battery container and showing battery cable extending into the battery box.

The positive battery cable 34 and the negative battery cable are routed into the battery box 10 through the bumpouts 18 of the upper lid 14, as shown in FIG. 15. Another battery cable 38 is routed into the battery box 10 through one or the upper cut-ins 28, as shown in FIG. 15.

Figure 16:
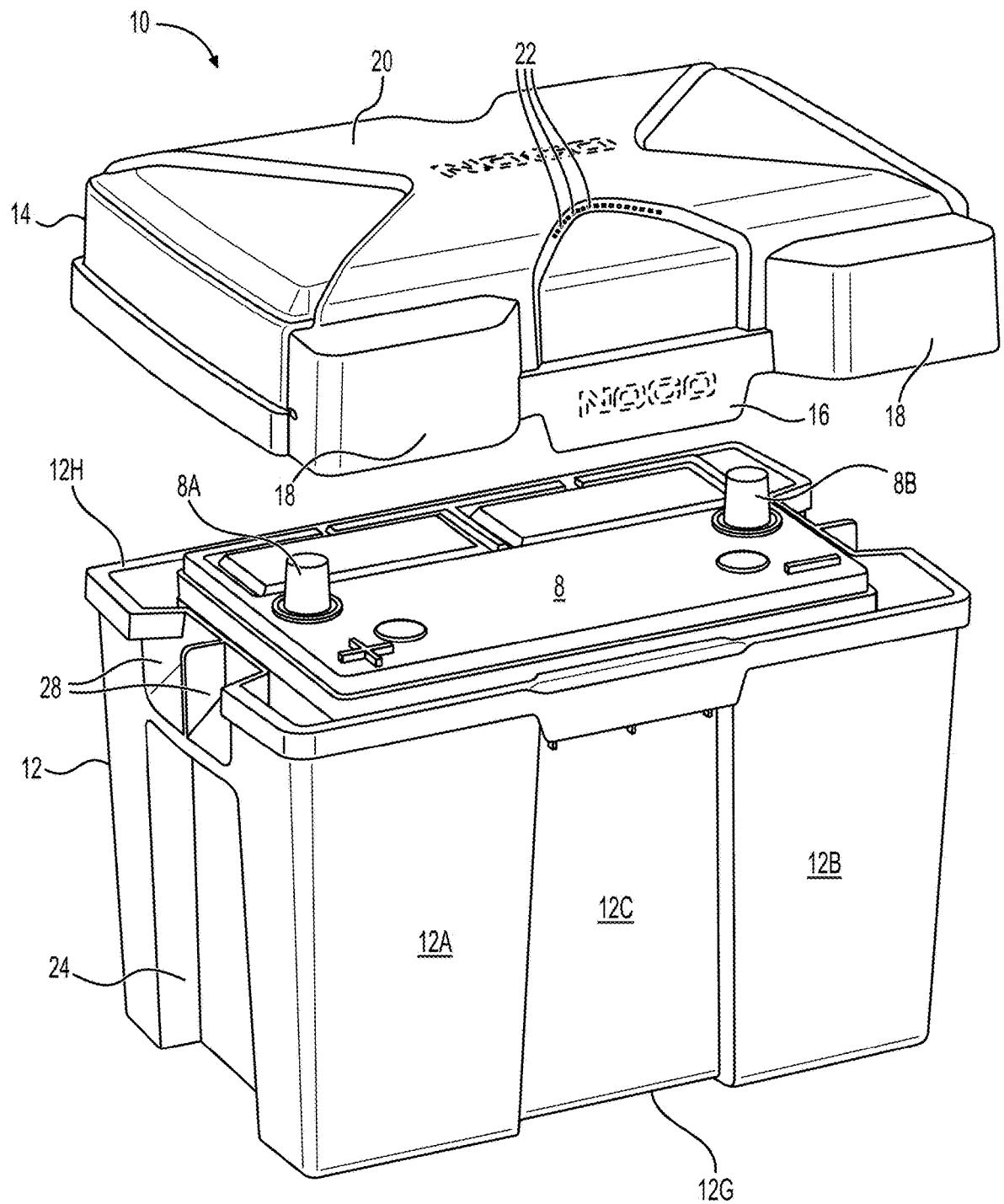
FIG. 16 is a perspective view of the battery box shown in FIG. 1 with the upper lid disconnected from the lower battery container.

The battery 8 is inserted into the lower receiver of the lower battery container 12, as shown in FIG. 16. The upper lid is position over the top of the lower battery container 12, and pushed downwardly to fit the upper lid 14 onto the top of the lower battery container 12. The lower battery container 12 is configured to define a lower receiver for accommodating a lower portion of the battery 8 therein. The upper lid 14 is releasably connected to the lower battery container 12 for covering the lower receiver of the lower battery container 12. The upper lid 14 defines an upper receiver for accommodating an upper portion of the battery 8. The upper lid 14 is forced downwardly to snap fit the upper lid 14 onto the lower battery container 12 to secure the upper lid 14 onto the lower battery container 12.

Figure 17A:
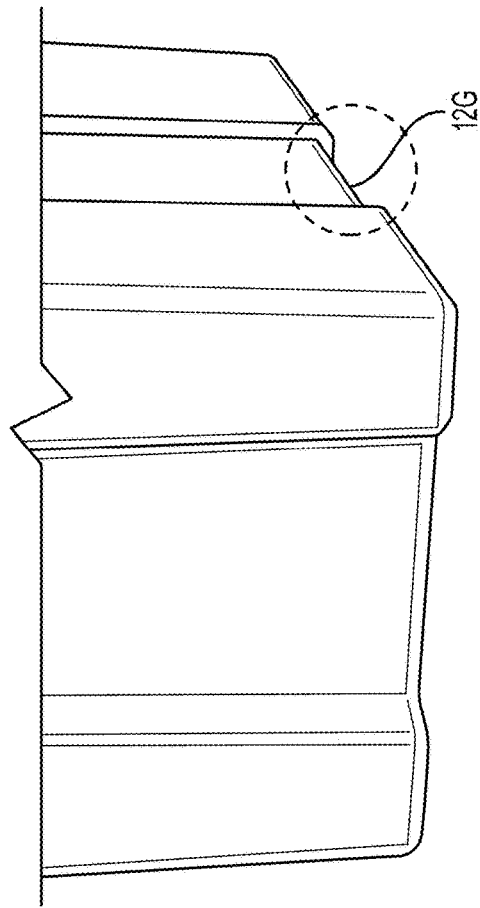
FIG. 17A is a perspective view of the lower portion of the battery box shown in FIG. 1 having a recessed channel for accommodating the battery strap shown in FIG. 17B.
Figure 17B:
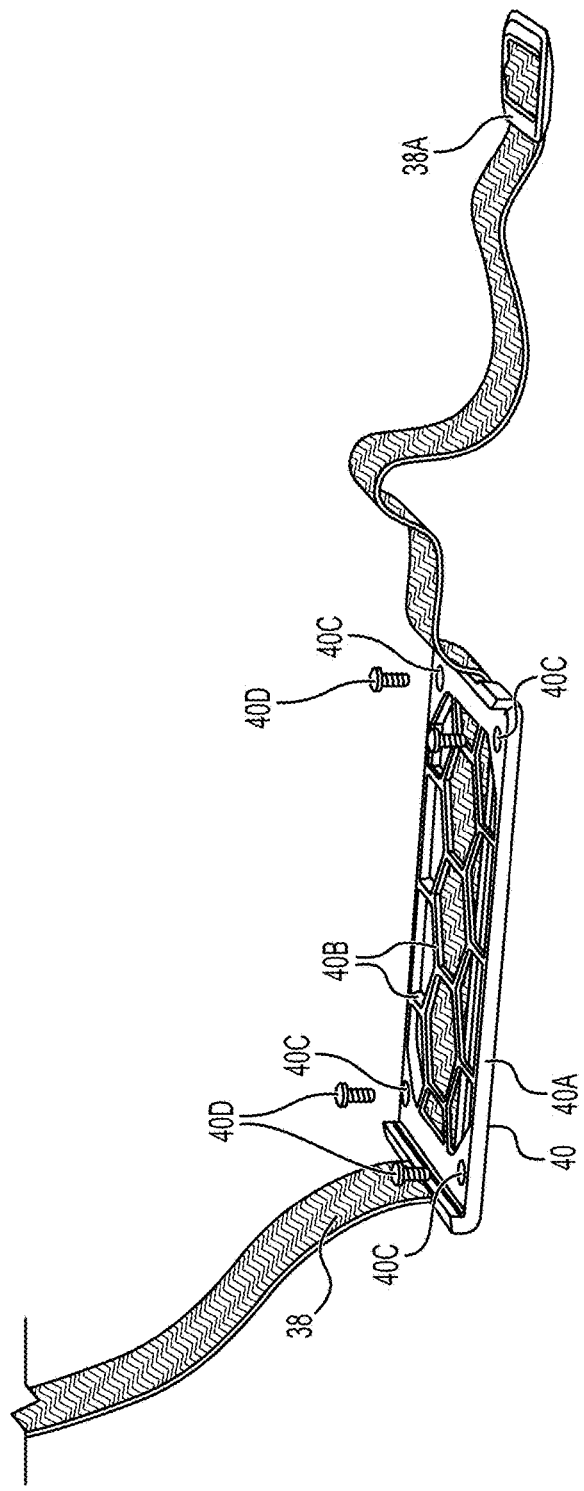
FIG. 17B is a perspective view of the battery bracket and strap to be connected into the recessed channel shown in FIG. 17A.
Figure 18:
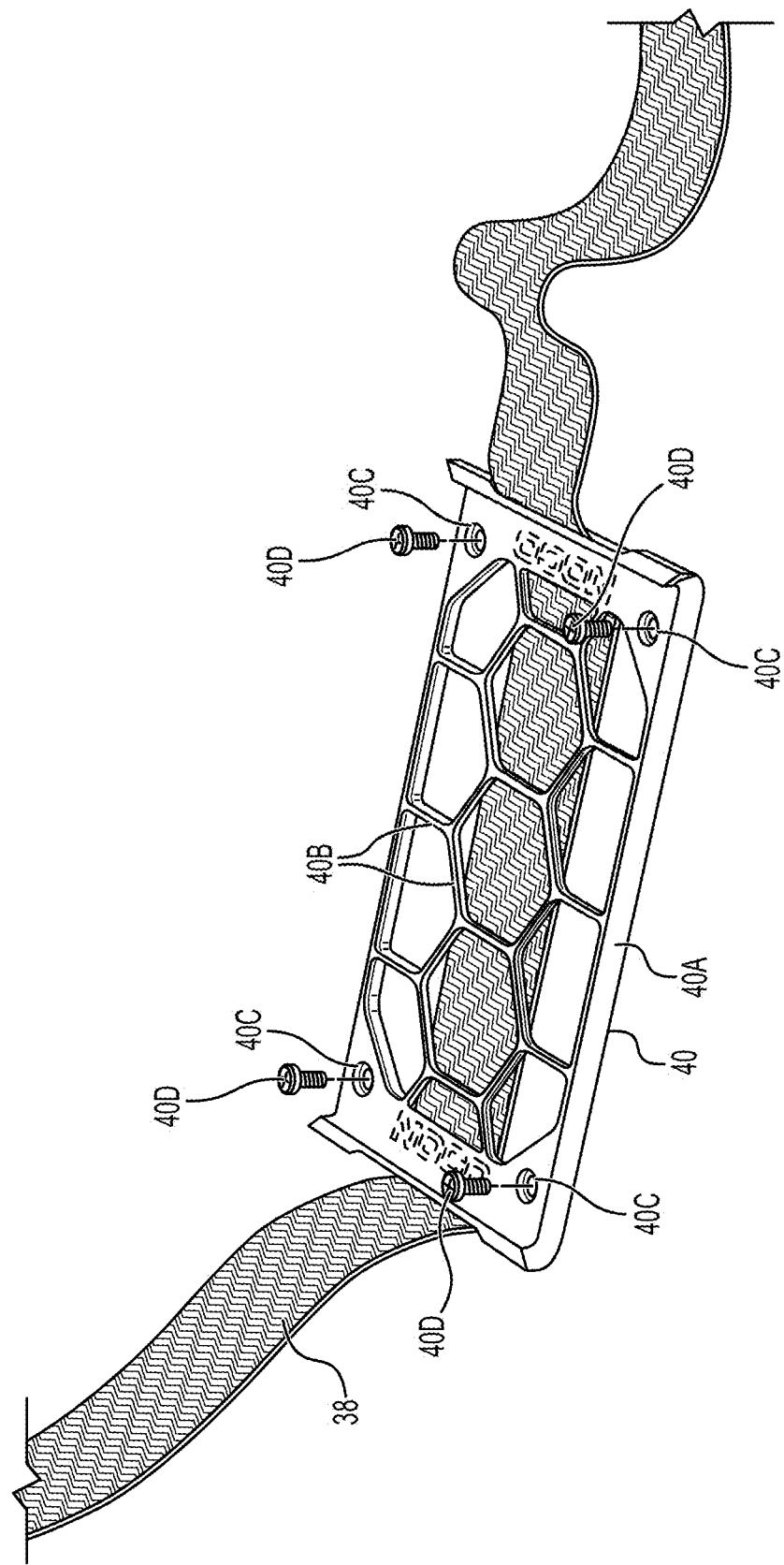
FIG. 18 is an enlarged view of the battery bracket and strap shown in FIG. 17B.
Figure 19:
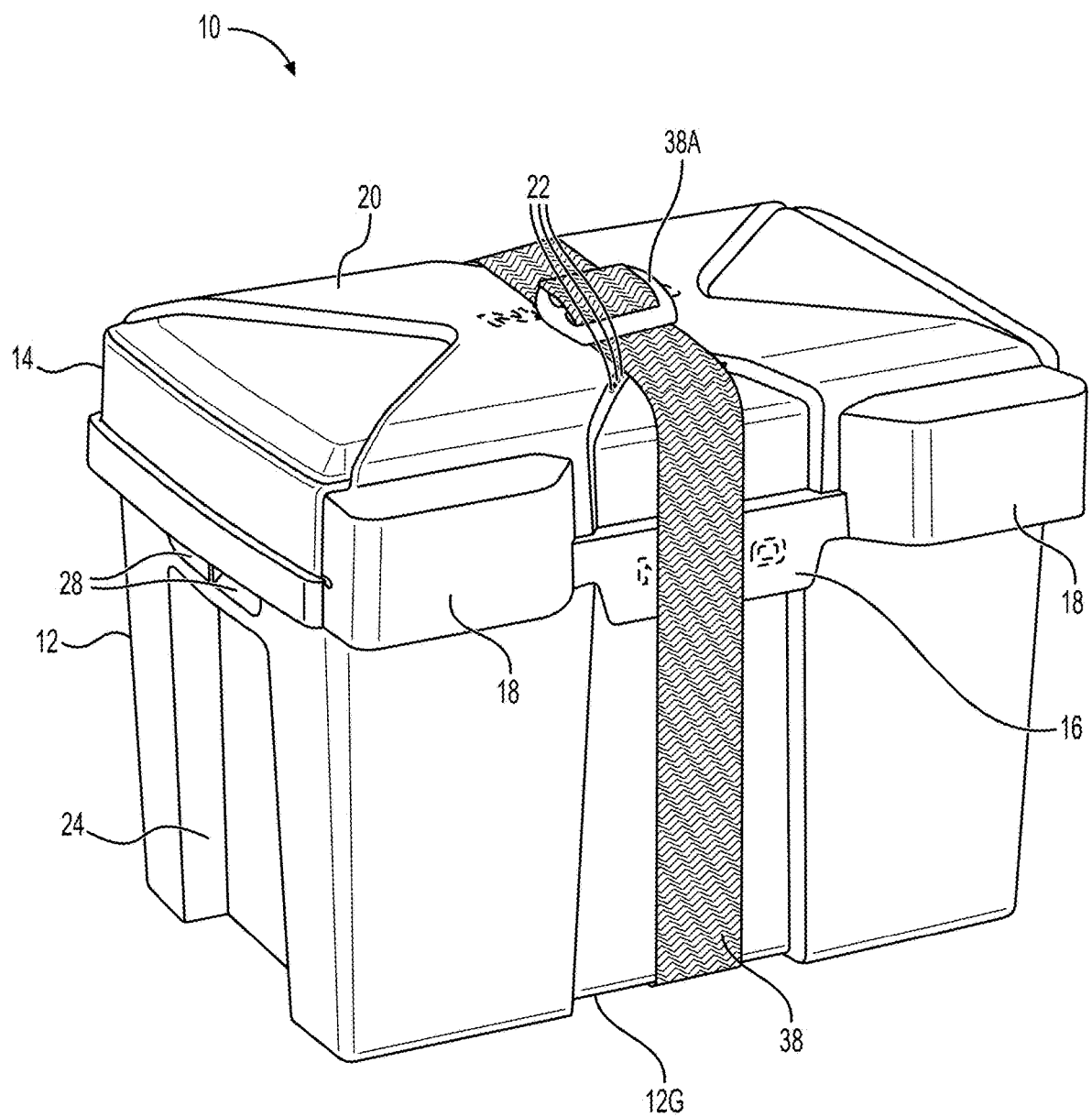
FIG. 19 is a perspective view of the battery box shown in FIG. 1 with the battery strap installed and tightened on the battery box.
Figure 20:
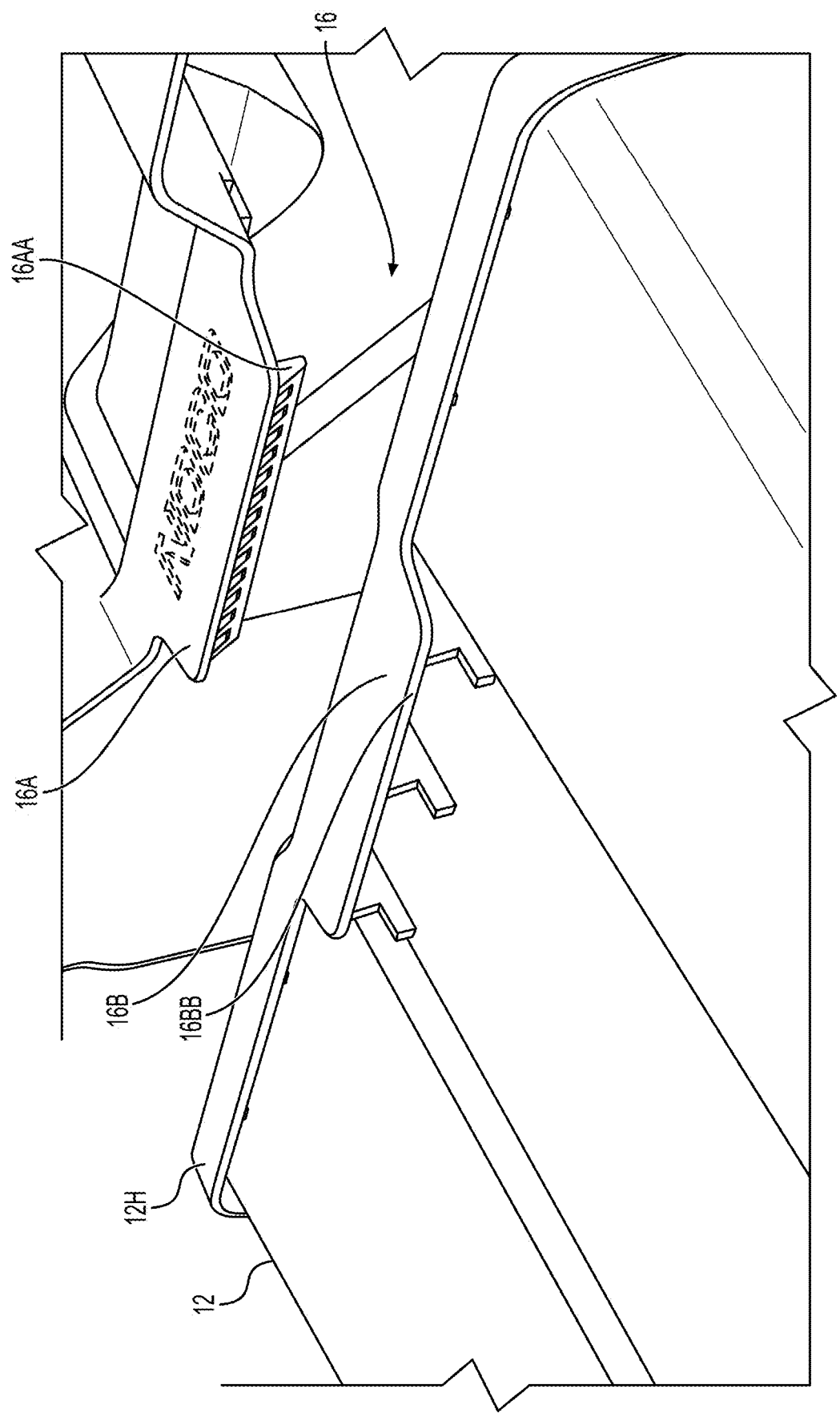
FIG. 20 is a detailed perspective view of the upper portion of the battery box shown in FIG. 1 with the upper lid disconnected from the lower battery container showing the snap fit connector.

The upper lid 14 of the lower battery container 12 can be secured onto the lower battery container using a strap 38 shown in FIGS. 17A and 18. The strap 38 is provided with a buckle 38A to tighten the strap, as shown in FIG. 19. A bracket 40 is used to secure the strap 38 into the recessed groove 12G located on the bottom of the lower battery container 12, as shown in FIG. 17A. The bracket 40 comprises a surrounding frame 40A connected to a honey comb structure 40B configured for securing the strap 38 to the bracket 40. The bracket 40 is provided with through holes 40C accommodating screws 40D for securing the bracket to the bottom wall 12J of the lower battery container 12.

Figure 21:
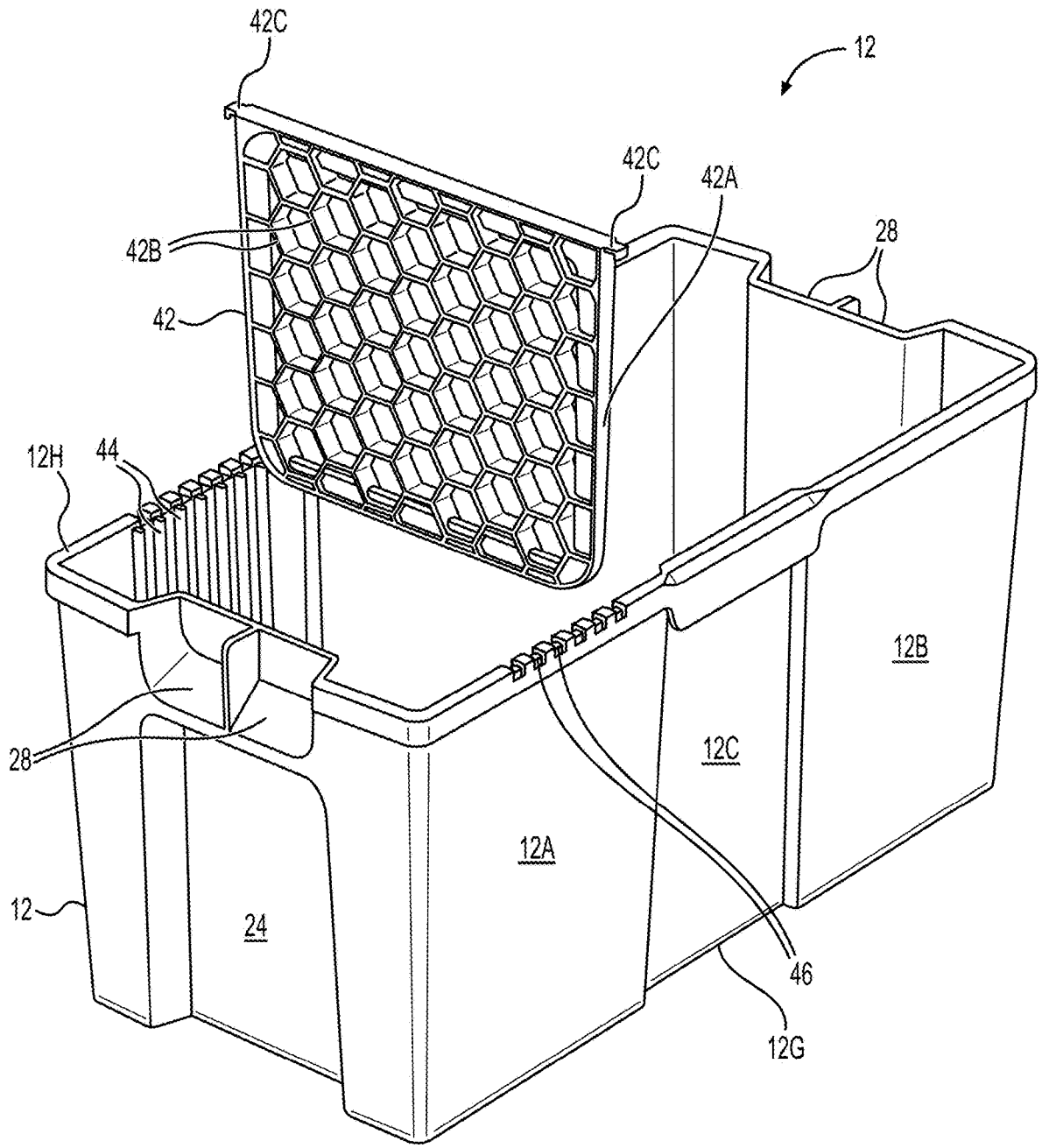
FIG. 21 is a perspective view of the battery box shown in FIG. 1 with a divider removed from the lower battery container.
Figure 22:
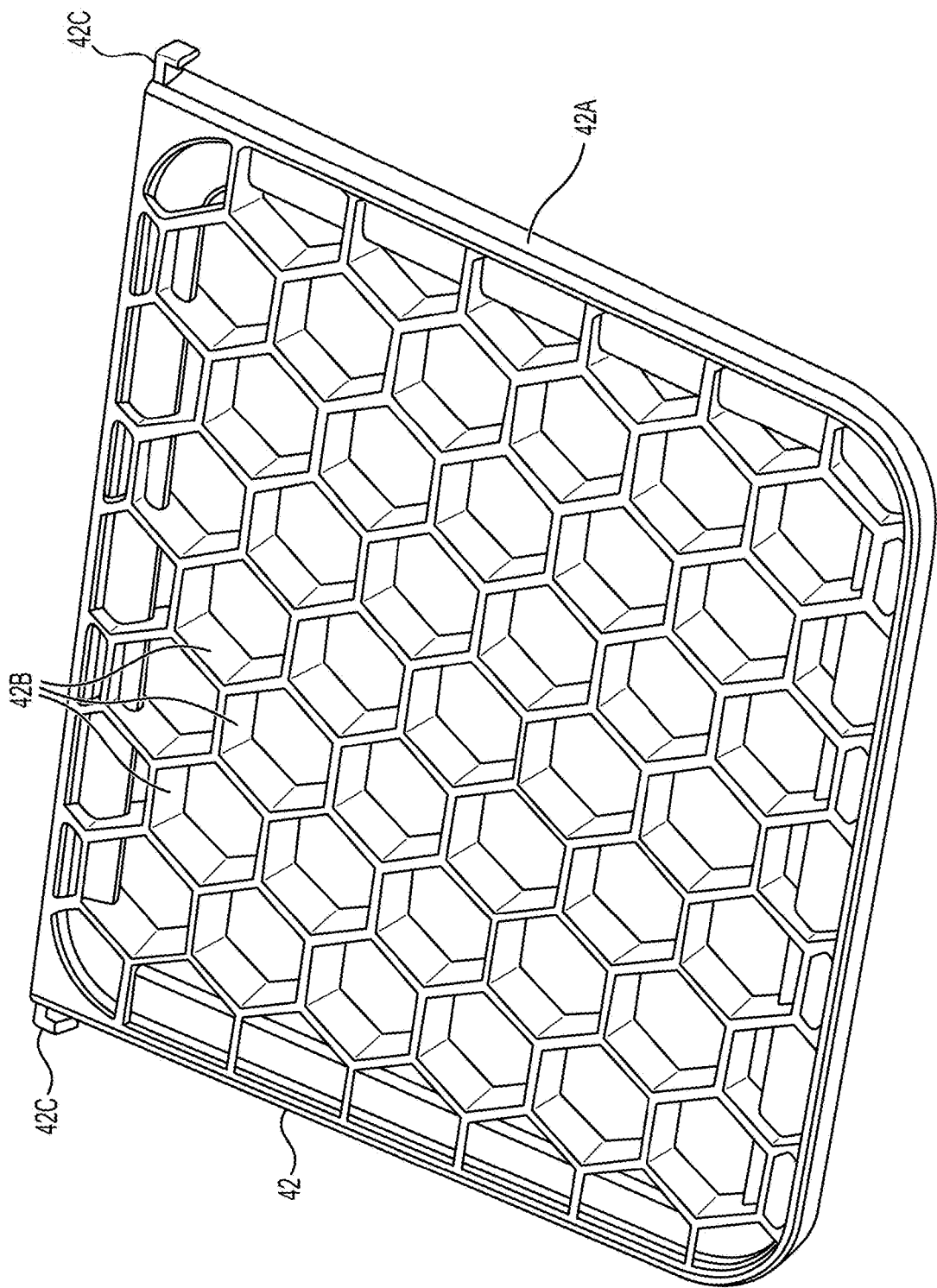
FIG. 22 is an enlarged perspective view of the divider shown in FIG. 21.

The lower battery container 12 is fitted with a divider 42 that can be moved to different positions to adjust the length of the lower receiver to accommodate different sized batteries, as shown in FIGS. 21 and 22. The inner wall of the lower battery container 12 is provided with a plurality of spaced apart vertical ribs 44 defining vertical grooves 46 to accommodate opposed edges of the divider 42 at a plurality of different positions. The divider 42 comprises an outer frame 42A connected to a honey comb shaped structure 42B, and a pair of opposed tabs 42C for cooperating with the grooves 46 located between the spaced apart vertical ribs 44 along the upper lip 12H of the lower battery container 12, as shown in FIG. 21.

The invention claimed is:

1. A battery box for containing a battery, the battery box comprising:
   a lower battery container configured to define a lower receiver for accommodating a lower portion of the battery therein, the lower battery container including a recessed groove extending along a bottom of the lower battery container;
   an upper lid releasably connected to the lower battery container for covering the lower receiver of the lower battery container, the upper lid configured to define an upper receiver for accommodating an upper portion of the battery;
   one or more snap fit connections for releasably connecting the upper lid to the lower battery container; and
   a strap configured to secure the upper lid to the lower battery container, the strap including a bracket configured to secure the strap to the recessed groove.

2. The battery box according to claim 1, wherein the one or more snap fit connections is defined by one or more upper snap fit connection parts provided on one or more sides of the upper lid cooperating with one or more lower snap fit connection parts provided on one or more sides of the lower battery container.

3. The battery box according to claim 2, wherein the one or more upper snap fit connection parts defines an inner horizontal-oriented channel for snap fitting the one or more lower snap fit connection parts therein.

4. The battery box according to claim 3, wherein the one or more upper snap fit connection parts are each provided with a rectangular-shaped channel and the one or more lower snap fit connection parts are rectangular-shaped protrusions configured to nest within the rectangular-shaped channel of the one or more upper snap fit connection parts.

5. The battery box according to claim 4, wherein a lower inner edge of the one or more upper snap fit connection parts of the upper lid is beveled and an upper edge of the one or more lower snap fit connection parts of the lower battery container are beveled so that the beveled lower inner edge of the one or more upper snap fit connection parts ride on the beveled upper edge of the one or more lower snap fit connection parts of the lower battery box to force the one or more upper snap fit connection parts outwardly when pressing the upper lid onto the lower battery container to allow the upper snap fit connection part and the lower snap fit connection part to snap fit together.

6. The battery box according to claim 5, wherein the one or more upper snap fit connection parts of the upper lid and the one or more lower snap fit connection parts of the lower battery container of the one or more snap fit connections are configured to disconnect by a user gripping the lower edge of the one or more upper snap fit connection parts and forcing the lower edge outwardly to disconnect the one or more snap fit connections.

7. The battery box according to claim 3, wherein the one or more upper snap fit connection parts extend downwardly from the upper lid, and the one or more upper snap fit connection parts are configured to allow a user to grip a lower edge of the one or more upper snap fit connection parts and force the lower edge outwardly to disconnect the one or more snap fit connections.

8. The battery box according to claim 3, wherein each of the one or more upper snap fit connection parts comprises a lower inwardly extending lip for gripping a lower horizontal surface of each of the one or more lower snap fit connection parts of the lower battery container.

9. The battery box according to claim 1, wherein the upper lid is provided with one or more air vent holes.

10. The battery box according to claim 9, wherein the one or more air vent holes is provided through an upper wall of the upper lid.

11. The battery box according to claim 10, wherein the one or more air vent holes a located at or adjacent to a highest position within the upper receiver of the upper lid.

12. The battery box according to claim 11, wherein the upper wall of the upper lid is provided with an upwardly extending protrusion, and the one or more air vents are located through a side wall of the upwardly extending protrusion.

13. The battery box according to claim 12, wherein the one or more air vents located through the side wall of the upwardly extending protrusion are weather resistant and hidden.

14. The battery box according to claim 13, wherein the one or more air vents located through the side wall of the upwardly extending protrusion are formed using slides in the mold tooling.

15. The battery box according to claim 1, wherein the front wall and rear wall of the lower battery container are each provided with a recessed strap receiving groove.

16. The battery box according to claim 1, wherein a front wall and a rear wall of the upper lid are each provided with a recessed strap receiving groove.

17. The battery box according to claim 15, wherein a front wall and a rear wall of the upper lid are each provided with a recessed strap receiving groove, and wherein the recess strap receiving grooves on the upper lid are aligned with the recessed strap receiving grooves on the lower battery container.

18. The battery box according to claim 1, wherein a front wall and a rear wall of the upper lid are each provided with a recessed strap receiving groove, and wherein an upper wall of the upper lid is provided with one or more recessed strap receiving grooves.

19. The battery box according to claim 15, wherein a front wall and a rear wall of the upper lid are each provided with a recessed strap receiving groove, and wherein an upper wall of the upper lid is provided with one or more recessed strap receiving grooves aligned with the recess strap receiving grooves on the front wall and the rear wall of the upper lid.

20. The battery box according to claim 15, wherein a front wall and a rear wall of the upper lid are each provided with a recessed strap receiving groove, wherein an upper wall of the upper lid is provided with one or more recessed strap receiving grooves aligned with the recess strap receiving grooves on the front wall and the rear wall of the upper lid, and wherein the recess strap receiving grooves on the upper lid are aligned with the recessed strap receiving grooves on the lower battery container.

21. The battery box according to claim 1, wherein the left wall and right wall of the lower battery box is provided with cut-ins or recesses.

22. The battery box according to claim 21, wherein the cut-ins or recesses are each provided with a handle for receiving finger tips of the user for lifting the battery box.

23. The battery box according to claim 22, wherein an upper edge portion of each handle is provided with spaced apart ribs or teeth configured to distribute a weight of the battery box on the user's hands and fingers and to enhance the grip between the user's fingers and the handles.

24. The battery box according to claim 1, wherein at least a portion of an inner side of a bottom wall of the lower battery container comprises a matrix of honey comb-shaped ribs forming a single integral construction, the bottom wall of the lower battery container further comprising a plurality of ring-shaped ribs, each ring-shaped rib having a through hole configured to receive a screw that secures the lower battery container to a vehicle.

25. The battery box according to claim 8, wherein the upper lid is provided with a protrusion extending upwardly from an upper wall of the upper lid, the one or more vent holes being located in an upper wall of the upper lid at a position to vent air located in an upper receiver for the battery.

26. The battery box according to claim 1, wherein the upper lid is provided with one or more bump outs for accommodating one or more battery cables when the upper lid is connected to the lower battery container.

27. The battery box according to claim 1, wherein the lower battery container is provided with one or more bump-outs for accommodating one or more battery cables when the upper lid is connected to the lower battery container.

28. The battery box according to claim 26, wherein the lower battery container is provided with one or more bump-outs for accommodating one or more battery cables when the upper lid is connected to the lower battery container.

29. The battery box according to claim 1, further comprising a strap for securing the battery box to a vehicle.

30. The battery box according to claim 1, further comprising a divider configured to fit within the lower receiver of the lower battery container, the divider is configured to adjust a size of the lower receiver of the lower battery container to fit different size batteries.

31. The battery box according to claim 1, wherein the inner sides of the front wall and rear wall of the lower battery container is provided with multiple spaced apart vertically oriented grooves to allow the divider to be located at different positions with the lower receiver of the lower battery container.

32. The battery box according to claim 30, wherein the divider is configured with a molded honeycomb-shaped wall and surrounding frame.

33. The battery box according to claim 30, wherein upper edges of the front wall and rear wall of the lower battery container is provided with spaced-apart ribs or teeth, and sides of the divider are provided with opposed gripping extensions cooperating with sets of grooves located between the spaced-apart ribs or teeth on the upper edges of the front wall and rear wall of the lower battery container.

34. The battery box according to claim 1, wherein the lower battery container comprises a bottom wall, a pair of opposed front and rear walls connected together by a pair of opposed side walls, the front walls and side walls extending upwardly from the bottom wall together defining a receiver for the battery.

35. The battery box according to claim 1, wherein the bracket comprises a surrounding frame connected to a honey comb structure configured to secure the strap to the bracket.

36. The battery box according to claim 35, wherein the bracket is provided with a plurality of through holes, each through hole configured to accommodate a screw for securing the bracket to the bottom of the lower battery container.

* * * * *